United States Patent
Oguchi et al.

(10) Patent No.: US 11,082,568 B2
(45) Date of Patent: Aug. 3, 2021

(54) COMMUNICATION SYSTEM AND PRINTING APPARATUS

(71) Applicant: FUJITSU COMPONENT LIMITED, Tokyo (JP)

(72) Inventors: Tatsuya Oguchi, Tokyo (JP); Sumio Watanabe, Tokyo (JP); Yukihiro Mori, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/361,744

(22) Filed: Mar. 22, 2019

(65) Prior Publication Data

US 2019/0306331 A1 Oct. 3, 2019

(30) Foreign Application Priority Data

Apr. 2, 2018 (JP) .............................. JP2018-070995

(51) Int. Cl.
*H04N 1/00* (2006.01)
*G06F 3/12* (2006.01)
*B41J 3/36* (2006.01)
*G06K 15/02* (2006.01)

(52) U.S. Cl.
CPC ............ *H04N 1/00206* (2013.01); *B41J 3/36* (2013.01); *G06F 3/1203* (2013.01); *H04N 1/00225* (2013.01); *H04N 1/00233* (2013.01)

(58) Field of Classification Search
None
See application file for complete search history.

(56) References Cited

U.S. PATENT DOCUMENTS

| 6,238,043 | B1 * | 5/2001 | Silverbrook | ....... H04N 1/32598 347/86 |
| 2004/0027457 | A1 * | 2/2004 | Silverbrook | ........... B41J 2/1752 348/207.2 |
| 2005/0134896 | A1 * | 6/2005 | Koga | ...................... H04L 63/08 358/1.14 |

(Continued)

FOREIGN PATENT DOCUMENTS

| CN | 102681798 | 9/2012 |
| CN | 205103807 U | 3/2016 |
| JP | 2006-159427 | 6/2006 |

OTHER PUBLICATIONS

Anonymous: "Developer Portal | Printing Labels through Bluetooth Low Energy on iOS",, Dec. 21, 2017 (Dec. 21, 2017), XP55612334, Retrieved from the Internet: URL: https://developer.zebra.comicommunity/home/blog/2017/12/21/printing-labels-through-bluetooth-low-energy-on-ios [retrieved on Aug. 12, 2019].

(Continued)

*Primary Examiner* — Beniyam Menberu
(74) *Attorney, Agent, or Firm* — IPUSA, PLLC

(57) ABSTRACT

A communication system includes an information terminal, and a printing apparatus configured to perform intergroup communication with the information terminal belonging to a group. The printing apparatus includes a printing part configured to perform printing, a data receiver configured to receive print data from the information terminal via the intergroup communication, and a print controller configured to control the printing part using the received print data.

10 Claims, 32 Drawing Sheets

(56) References Cited

U.S. PATENT DOCUMENTS

| | | | | |
|---|---|---|---|---|
| 2005/0197158 | A1* | 9/2005 | Silverbrook | G06F 3/0321 455/556.2 |
| 2007/0195211 | A1* | 8/2007 | Fujimori | G09G 5/399 349/5 |
| 2008/0211825 | A1* | 9/2008 | Sunakawa | G06F 3/1446 345/581 |
| 2008/0213030 | A1* | 9/2008 | Lapstun | B41J 2/17503 401/195 |
| 2008/0253667 | A1* | 10/2008 | Shiraishi | G06F 3/1204 382/232 |
| 2010/0295951 | A1* | 11/2010 | Silverbrook | B41J 2/16508 348/207.2 |
| 2012/0057919 | A1* | 3/2012 | Lapstun | B41J 13/106 401/44 |
| 2012/0243929 | A1* | 9/2012 | Tanaka | G06K 15/189 400/606 |
| 2013/0055069 | A1* | 2/2013 | Seo | G06F 40/186 715/234 |
| 2013/0107303 | A1* | 5/2013 | Uchida | G06F 3/03545 358/1.13 |
| 2014/0240765 | A1* | 8/2014 | Nishida | G06F 3/1287 358/1.15 |
| 2015/0077794 | A1* | 3/2015 | Ezoe | G06F 3/1284 358/1.15 |
| 2016/0248935 | A1* | 8/2016 | Li | G06F 3/1222 |
| 2017/0031341 | A1* | 2/2017 | Sugama | G06K 7/10712 |
| 2018/0183970 | A1* | 6/2018 | Ka Wai | H04L 67/306 |

OTHER PUBLICATIONS

Anonymous: "Using Python to Store Data From Many BLE Devices—DZone IoT",, Jul. 16, 2017 (Jul. 16, 2017), XP55612367, Retrieved from the Internet: URL: https://dzone.com/articles/using-python-to-store-data-from-many-ble-devices [retrieved on Aug. 12, 2019].

Environment Bluetooth: "Link-OS",, Oct. 4, 2014 (Oct. 4, 2014), XP55612343, Retrieved from the Internet: URL: https://www.zebra.com/content/dam/zebra/software/en/application-notes/AppNote-BlueToothLE-v4.pdf [retrieved on Aug. 14, 2019].

* cited by examiner

| REGION | DATA ITEM | CONTEXT DATA ||||
|---|---|---|---|---|---|
| | | SETTING INFORMATION | IDENTIFIER | DESCRIPTION ||
| HEADER | CONTEXT ID | CONTEXT ID | — | IDENTIFICATION FOR UNIQUELY IDENTIFYING CONTEXT DATA ||
| | | ENABLE FLAG | — | 0: DISABLE<br>1: ENABLE ||
| | GROUP ID | GROUP CLASSIFICATION | — | 00: FREE<br>01: SMALL GROUP<br>10: MEDIUM GROUP<br>11: LARGE GROUP ||
| | | GROUP ID | — | IDENTIFICATION FOR UNIQUELY IDENTIFYING GROUP ||
| | USER ID | ENABLE FLAG | — | 0: DISABLE<br>1: ENABLE ||
| | | USER ID | — | IDENTIFICATION INFORMATION FOR UNIQUELY IDENTIFYING USER ||
| DATA REGION | | POSITION | @POS | POSITION INDICATING OUTPUT POSITION,<br>E.G. COORDINATE VALUE, REGION SIZE, ETC. ||
| | | POSITION SET | @SPOS | AGGREGATE OF POSITION INFORMATION ||
| | | LIST | @LST | CHARACTER STRING OF TRANSMITTING & RECEIVING TARGET ||
| | ELEMENT | MODIFIER | @MOD | ATTRIBUTE OF CHARACTER STRING OF TRANSMITTING & RECEIVING TARGET,<br>E.G. CHARACTER TYPE, CHARACTER SIZE, ROTATION, ETC. ||
| | | FRAME IMAGE | @FLM | FRAME IMAGE DATA OF TRANSMITTING & RECEIVING TARGET ||
| | | BLOCK IMAGE | @BLK | BLOCK IMAGE DATA OF TRANSMITTING & RECEIVING TARGET ||
| | | UNIT IMAGE | @UPT | UNIT PATTERN IMAGE DATA OF TRANSMITTING & RECEIVING TARGET ||
| | COMBI-NATION | ZIP INFORMATION | @ZIP | COMBINATION OF ELEMENT INFORMATION,<br>E.G. @ZIP=(@POS, @MOD),<br>@ZIP=(@SPOS, @UPT) ||
| | EXPANSION | MAPPING INFORMATION | @MAP | DEFINITION OF CONTENT OF EXPANSION PROCESS,<br>E.G. @MAP=(Op, @ZIP, @LST),<br>@MAP=(Op, @POS, @FLM),<br>@MAP=(Op, @POS, @BLK),<br>@MAP=(Op, @IDX, @ZIP) ||

FIG.9

- CONTEXT DATA (C)
(1) FLM (SHARED)
(2) LST (C)
(3) BLK (C)
(4) ZIP (C1) COMBINING BLK (C) TO POS (SHARED)
(5) ZIP (C2) COMBINING MOD (SHARED) TO LST (C)
(6) ZIP (C3) COMBINING ZIP (C2) TO POS (SHARED)
(7) MAP (C4) COMBINING ZIP (C1) TO FLM (SHARED)
(8) MAP (C5) COMBINING ZIP (C3) TO FLM (SHARED)

FIG.22A

- CONTEXT DATA (A)
(1) LST (A)
(2) BLK (A)
(3) ZIP (A1) COMBINING BLK (A) TO POS (SHARED)
(4) ZIP (A2) COMBINING MOD (SHARED) TO LST (A)
(5) ZIP (A3) COMBINING ZIP (A2) TO POS (SHARED)
(6) MAP (A4) COMBINING ZIP (A1) TO FLM (SHARED)
(7) MAP (A5) COMBINING ZIP (A3) TO FLM (SHARED)

FIG.22B

- CONTEXT DATA (B)
(1) LST (B)
(2) BLK (B)
(3) POS (B)
(4) MOD (B)
(5) ZIP (B1) COMBINING BLK (B) TO POS (SHARED)
(6) ZIP (B2) COMBINING MOD (B) TO LST (B)
(7) ZIP (B3) COMBINING ZIP (B2) TO POS (B)
(8) MAP (B4) COMBINING ZIP (B1) TO FLM (SHARED)
(9) MAP (B5) COMBINING ZIP (B3) TO FLM (SHARED)

FIG.22C

- CONTEXT DATA (A+B+C)
(1) FLM (SHARED)
(2) LST (C)
(3) LST (A)
(4) LST (B)
(5) BLK (C)
(6) BLK (A)
(7) BLK (B)
(8) POS (B)
(9) MOD (B)
(10) ZIP (C1) COMBINING BLK (C) TO POS (SHARED)
(11) ZIP (C2) COMBINING MOD (SHARED) TO LST (C)
(12) ZIP (C3) COMBINING ZIP (C2) TO POS (SHARED)
(13) ZIP (A1) COMBINING BLK (A) TO POS (SHARED)
(14) ZIP (A2) COMBINING MOD (SHARED) TO LST (A)
(15) ZIP (A3) COMBINING ZIP (A2) TO POS (SHARED)
(16) ZIP (B1) COMBINING BLK (B) TO POS (SHARED)
(17) ZIP (B2) COMBINING MOD (B) TO LST (B)
(18) ZIP (B3) COMBINING ZIP (B2) TO POS (B)
(19) MAP (C4) COMBINING ZIP (C1) TO FLM (SHARED)
(20) MAP (C5) COMBINING ZIP (C3) TO FLM (SHARED)
(21) MAP (A4) COMBINING ZIP (A1) TO FLM (SHARED)
(22) MAP (A5) COMBINING ZIP (A3) TO FLM (SHARED)
(23) MAP (B4) COMBINING ZIP (B1) TO FLM (SHARED)
(24) MAP (B5) COMBINING ZIP (B3) TO FLM (SHARED)

FIG.23

COMMUNICATION SYSTEM AND PRINTING APPARATUS

CROSS-REFERENCE TO RELATED APPLICATIONS

This application is based upon and claims priority to Japanese Patent Application No. 2018-070995 filed on Apr. 2, 2018, the entire contents of which are incorporated herein by reference.

BACKGROUND OF THE INVENTION

1. Field of the Invention

The embodiments discussed herein are related to a communication system and a printing apparatus.

2. Description of the Related Art

Conventionally, a mobile printer that is portable and compact, to enable printing when a user is outdoors, working remotely, or the like is known (refer to Japanese Laid-Open Patent Publication No. 2006-159427, for example).

However, it is difficult to reduce the mobile printer to a size smaller, due to size constraints on a printing mechanism or elements associated with the printing mechanism, including an input device, a display device, and a battery. In addition, because a conventional mobile printer prioritizes the printing function, the mobile printer cannot manage communication as a master apparatus when the mobile printer performs an intergroup communication with an external apparatus.

SUMMARY OF THE INVENTION

Accordingly, it is an object in one aspect of the embodiments to easily enable intergroup communication by a printing apparatus that is easy to carry.

According to one aspect of embodiments of the present invention, a communication system includes an information terminal; and a printing apparatus configured to perform intergroup communication with the information terminal belonging to a group, wherein the printing apparatus includes a printing part configured to perform printing, a data receiver configured to receive print data from the information terminal via the intergroup communication, and a print controller configured to control the printing part using the received print data.

Other objects and further features of the present invention will be apparent from the following detailed description when read in conjunction with the accompanying drawings.

BRIEF DESCRIPTION OF THE DRAWINGS

FIG. 9 is a diagram illustrating a data structure of context data for intergroup communication used by the printer;

FIG. 22A, FIG. 22B, and FIG. 22C are diagrams illustrating examples of the context data used by the communication system;

FIG. 23 is a diagram illustrating an example of the context data used by the communication system;

DESCRIPTION OF THE EMBODIMENTS

Embodiments

Figure 1:
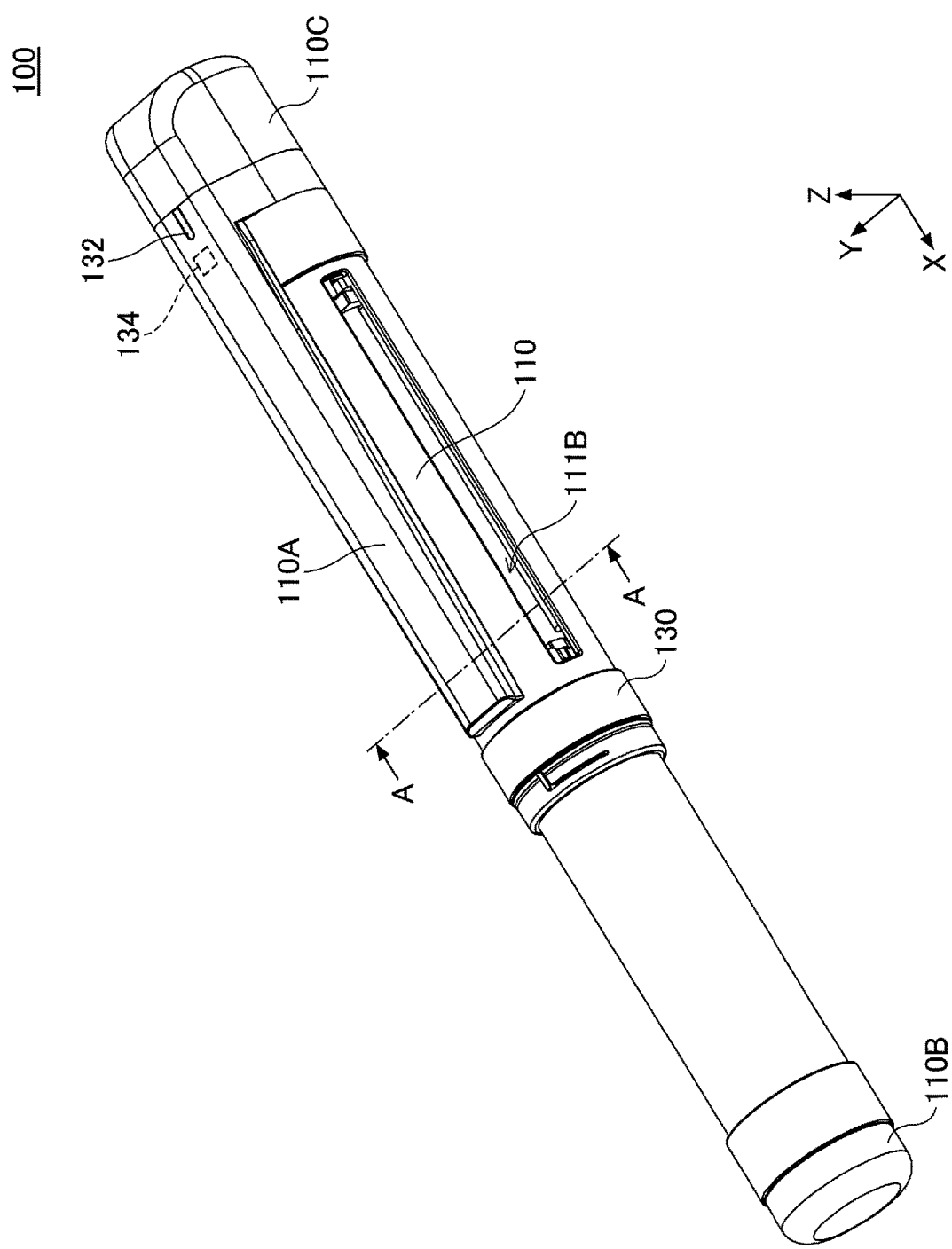
FIG. 1 is a perspective view of an external appearance of a printer in one embodiment.

Embodiments of a printing apparatus ("printer") and a communication system according to the present invention will be described, by referring to the drawings. In the drawings, those parts or members that are the same are designated by the same reference numerals, and a description of the same parts or members may be omitted.

(Outline of Printer)

FIG. 1 is a perspective view of an external appearance of a printer 100 in one embodiment. For the sake of convenience in the following description, a longitudinal direction of the printer 100 is denoted by an X-direction, and directions perpendicular to the X-direction are denoted by a Y-direction and a Z-direction.

The external appearance of the printer 100 is pen-shaped, which is an elongated cylindrical shape. The printer 100 is an IoT (Internet of Things) device that is compact and portable. The printer 100 includes a printing function and a wireless communication function. For example, the printer 100 has a diameter of approximately 18 mm to approximately 20 mm, and a length of approximately 165 mm to approximately 170 mm.

The printer 100 includes a pen-shaped casing 110. A hook 110A extending along the longitudinal direction is provided on the casing 110. The printer 100 may be hooked to a breast pocket or the like using the hook 110A, similarly to hooking writing utensils to the breast pocket.

The printer 100 is detachable to a portable information terminal, and may be carried integrally together with the attached portable terminal. The printer 100 performs intergroup communication with the portable terminal, and print using print data received from the portable terminal. The intergroup communication refers to communication that only specific users belonging to specific groups may participate. The printer 100 may also perform the intergroup communication with other apparatuses such as another printer or a sensor device. The printer 100 may use label paper having the A8 size (52 mm×74 mm), for example. The label paper printed with images and characters by the printer 100 may be pasted on a notebook, scrapbook, pocketbook, or the like.

A cylinder-shaped dial switch 130 is provided on an outer periphery of the casing 110. The dial switch 130 enables the user to operate the printer 100 to perform various operations, such as turning on and turning off the power supply, or switching an operation mode. The dial switch 130 may be rotated in different directions.

An indicator 132 provided on the hook 110A indicates various states of the printer 100, including the on or off state of the power supply, a printing state, and the operation mode. The indicator 132 may include LEDs (Light Emitting Diodes), for example.

An antenna 134 provided on the hook 110A transmits and receives radio waves of the wireless communication with the outside using BLE (Bluetooth Low Energy) or the like.

A detachable cap 110B is provided on an end of the casing 110. In addition, a detachable cap 110C is provided on an end of the casing 110. The printer 100 may receive the print data from the information processing apparatus other than the portable terminal, such as the other printer. In addition, by storing the print data in a memory of the printer 100, it is possible to print the print data stored in the memory, even if the printer 100 is not communicably connected to the portable terminal.

The printer 100 may print the image data received from the external apparatus. In addition, the printer 100 may store the received print data in the memory, and print the image data stored in the memory, even if the printer 100 is not communicably connected to the external apparatus.

Various functions of the printer 100, such as the communication function, the printing function, an application function, may be controlled via operation of the dial switch 130. The functions of the printer 100 may also be controlled from a portable terminal communicates with the printer 100.

As a data management function, the printer 100 may download and store data output from the portable terminal into the memory, and independently register the data stored in the memory to a host such as a PC (Personal Computer). Hence, the portable terminal may perform an operation without being interrupted. Data management efficiency may be improved by pseudo-sequential processing. In addition, the data registered in the portable terminal in many cases are buried among excessive information. Accordingly, the sequential printing by the printer 100 and filing thereof can prevent the data from becoming buried.

By downloading and storing personal information of the portable terminal into the memory, the printer 100 may function as a filing apparatus that can avoid the personal information from remaining in the portable terminal. The printer 100 may be rested on a cradle to upload the data stored in the memory to the PC. Because the printer 100, unlike the smartphone, is not operated frequently, it is possible to reduce the risks of loosing the printer 100.

The printer 100 may become a functional and effective file management tool when the user pastes the printed label on the notebook or the like, and adds handwritten comments if required.

For sorting purposes, the printer 100 may use a stacked cassette, and set paper having different colors, different shapes, and different lengths, to switch and use the different paper.

As a data sharing function, two printers 100 that are registered as a pair may function as independent local communication devices. The first printer 100 can be set as a host device when the dial switch 130 of the first printer 100 is pressed a specified number of times and then rotated clockwise to set a transmitting host, and the second printer 100 can be set as a slave device when the dial switch 130 of a second printer 100 is pressed the same number of times and then rotated counterclockwise. Alternatively, the first and second printers 100 can be initially defined as a host device and a slave device among a group. By setting so, the data may be transmitted from the host device to the slave device via a local network formed solely between two devices. Such printers may form an effective local information communication tool that can be used for a communication such that it is preferable not to post the personal information on an SNS (Social Networking Service).

The printer 100 may exchange the information using a field definition format, and thus, an amount of information of registration communication can be reduced. In addition, nonstandard format information uses an image compression format or the like. Because normal management information is mainly the standard format, a standard platform is registered in the portable terminal, the printer 100, and the PC, and only update information is exchanged.

The printer 100 may exchange information using the field definition format, and share the standard platform among the printers 100 of a group, so that information of a plurality of persons may be output in one form and shared. In other words, instead of separately printing on each of the individual printers 100 and sharing the plurality of printed media, the information is shared on the standard platform and aggregated, edited, and printed on a single printing medium. As a result, information sharing may be efficiently performed among the printers 100 of the group.

A recorder function enables the printer 100 to be used as a recorder. When the information is to be received and filed by the portable terminal, the memory will be consumed, and the terminal will be temporarily occupied as required. On the other hand, when the printer 100 is used as the recorder, the portable terminal may perform other work while the printer 100 performs recorder function, to enabling efficient use of the portable terminal.

The printer 100 may copy and input the image of only the required part of a stock price chart, health information, or the like to the terminal body. For the recorder use, the printer 100 may use fanfold paper.

A status display function is set by pressing the dial switch 130 a specified number of times after the power is turned on. The printer 100 indicates the mode by lighting the LEDs. When the state is "1", red LED is lighted for 1 second and turned off for 0.5 second. When the state is "0", green LED is lighted for 1 second and turned off for 0.5 second. When displaying a state "1011" for example, the LED is blinked in an order of red lighted for 1 second, turned off for 0.5 second, green lighted for 1 second, turned off for 0.5 second, red lighted for 1 second, turned off for 0.5 second, red lighted for 1 second and turned off for 0.5 second. 16 states can be displayed by the LEDs.

The printer 100 may manage a power supply, and may thus be put into a standby mode. When the printer 100 is lost, it is possible to remotely wake up the printer 100 by the BLE communication, and the location of the printer 100 may be confirmed by causing a motor to resonate, for example.

The printer 100 may optionally include a charger cap, and may be mounted with a writing pen. In this case, the writing pen can be integrally carried with the printer.

The printer 100 can be used as a laser pointer by mounting a laser pointer at a head motor cap, and using the indicator to display an on/off status of the laser pointer.

When the printer 100 is a master device, other slave printers may be detected by successive scans, so that inter-group communication is performed with the other detected printers.

(Printer 100)

Figure 2:
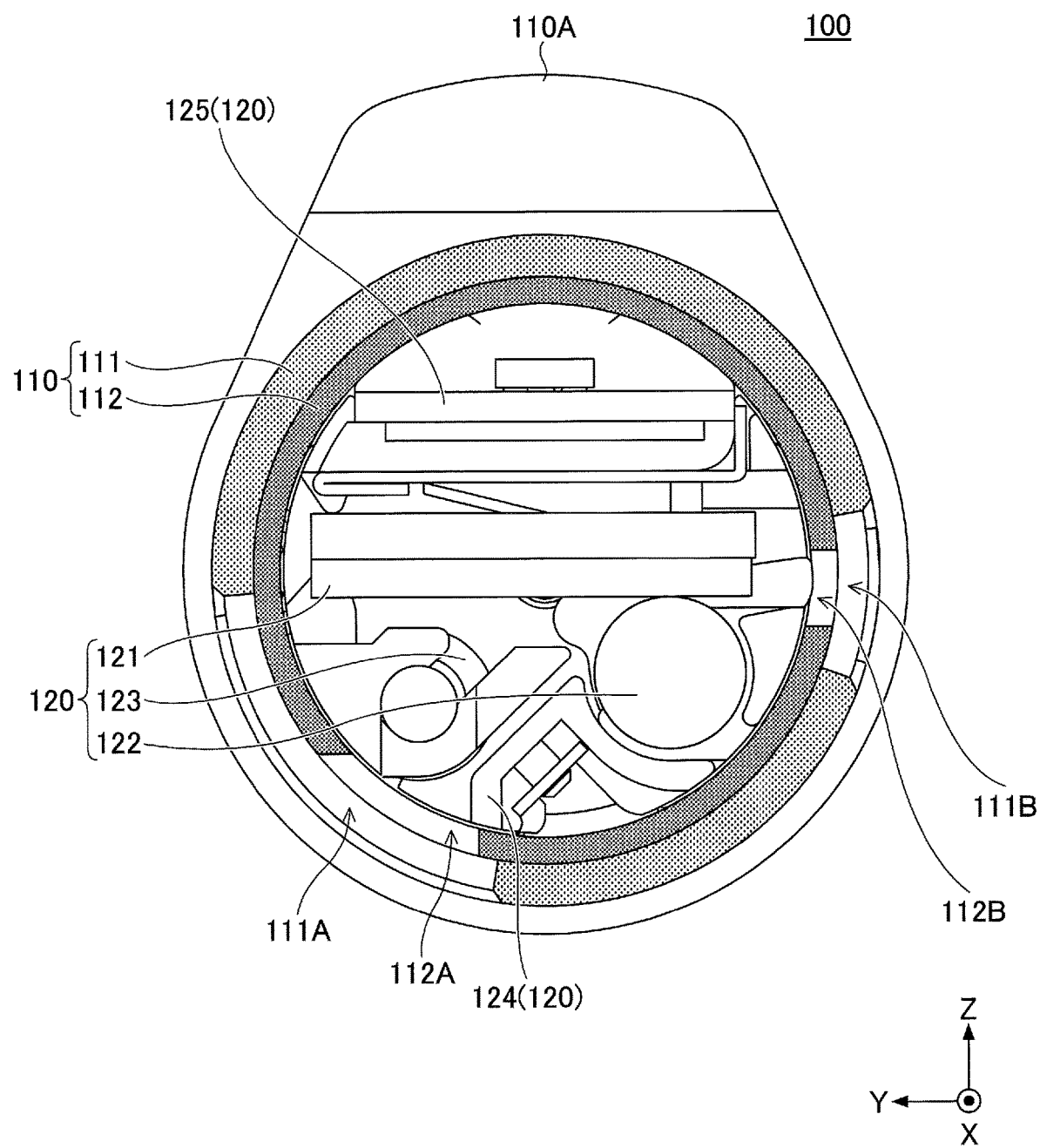
FIG. 2 is a cross sectional view of the printer along a line A-A in FIG. 1.

FIG. 2 is a cross-sectional view of the printer 100 along a line A-A in FIG. 1. As illustrated in FIG. 2, the casing 110 includes an outer cylinder 111 and an inner cylinder 112 respectively having a cylindrical shape. The casing 110 has a dual component structure in which the inner cylinder 112 is inserted into the outer cylinder 111. The outer cylinder 111 is rotatable with respect to the inner cylinder 112. A feed opening 111A and an ejection opening 111B are formed in the outer cylinder 111. In addition, a feed opening 112A and an ejection opening 112B are formed in the inner cylinder 112.

As illustrated in FIG. 2, a printing mechanism 120 is provided inside the inner cylinder 112. The printing mechanism 120 is an example of, and hereinafter referred to as a "print unit". The print unit 120 is a so-called thermal printer that can print on recording paper fed from a cassette 150 illustrated in FIG. 3. The print unit 120 includes a thermal head 121, a platen roller 122, a feed roller 123, a sheet guide 124, and a controller 125.

The thermal head 121 includes a plurality of heater elements arranged in the X-direction. The platen roller 122 is a cylindrical member extending in the X-direction, and opposes the thermal head 121. By pinching the recording paper between the platen roller 122 and the thermal head 121, the recording paper can be pressed against the thermal head 121. Heating of the heater elements is controlled by control signals supplied from the controller 125, so that the thermal head 121 can form an image on the recording paper.

The feed roller 123 is a cylindrical member extending in the X-direction. By rotating the feed roller 123, the recording paper fed from the feed opening 111A and the feed opening 112A is fed between the thermal head 121 and the platen roller 122 along the sheet guide 124.

The controller 125 includes a head driver and a motor driver (not illustrated). The head driver supplies print line data output from a CPU (Central Processing Unit) 401 to the thermal head 121, to control the driving of the thermal head 121. The motor driver controls the driving of a pulse motor (not illustrated) for feeding the recording paper, based on motor control data output from the CPU 401.

(Mounting Cassette 150)

Figure 3:
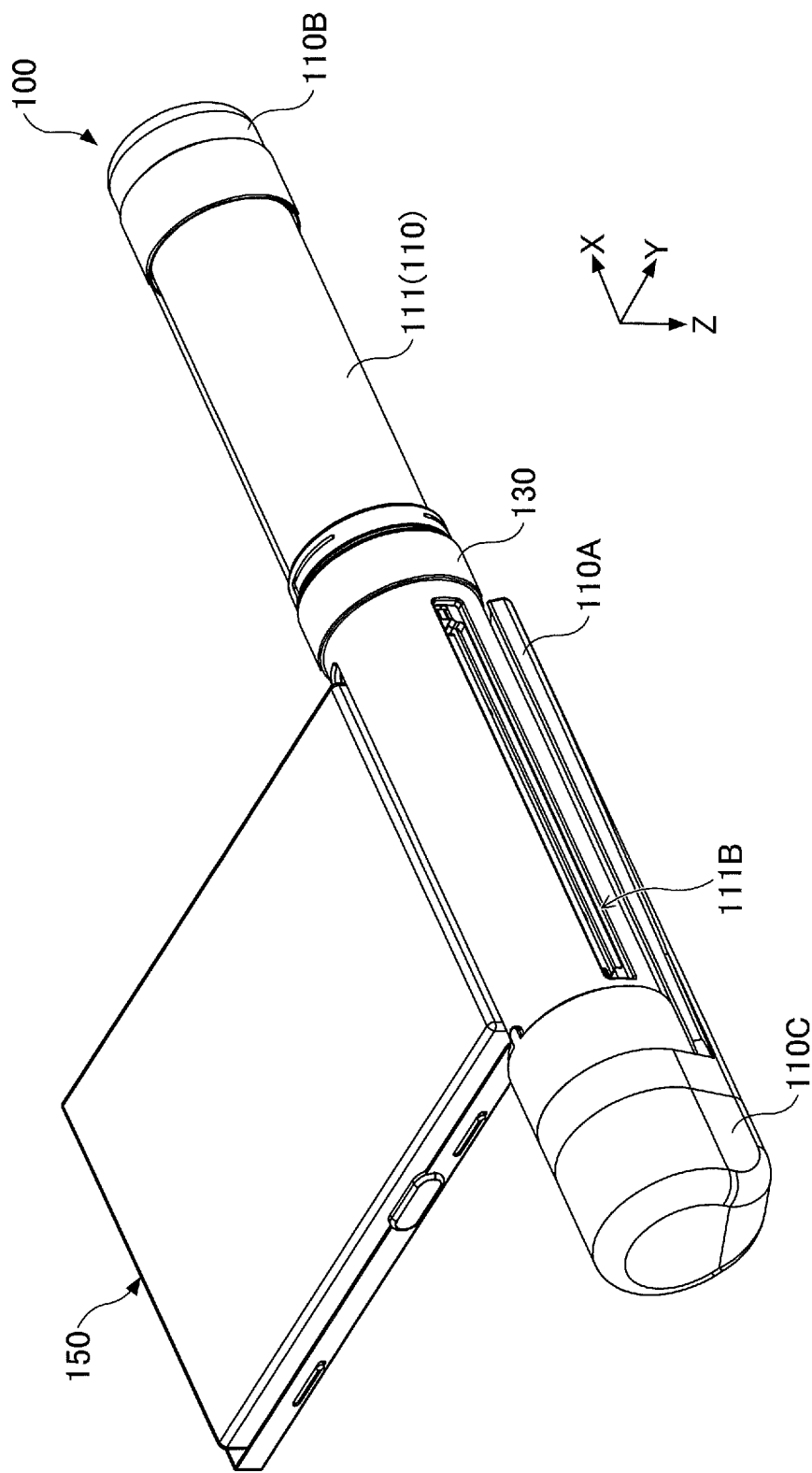
FIG. 3 is a perspective view of the external appearance of the printer in a state having a cassette connected thereto.

FIG. 3 is a perspective view of the external appearance of the printer 100 in a state having the expansion cassette 150 connected thereto. When printing by the printer 100, the outer cylinder 111 is rotated with respect to the inner cylinder 112, so that the feed opening 111A and the feed opening 112A are aligned, and the ejection opening 111B and the ejection opening 112B are aligned, as illustrated in FIG. 2. Then, as illustrated in FIG. 3, the cassette 150 is mounted at the feed opening 111A. The recording paper can be supplied from the cassette 150 to the print unit 120 via the feed opening 111A and the feed opening 112A. The recording paper is ejected from the print unit 120 via the ejection opening 111B and the ejection opening 112B. As illustrated in FIG. 3, the cassette 150 has a thin parallelepiped shape, and is capable of accommodating therein a large number of sheets of the recording paper. The cassette 150 supplies the recording paper accommodated therein to the printer 100, one sheet at a time.

(Hardware Structure of Printer 100)

Figure 4:
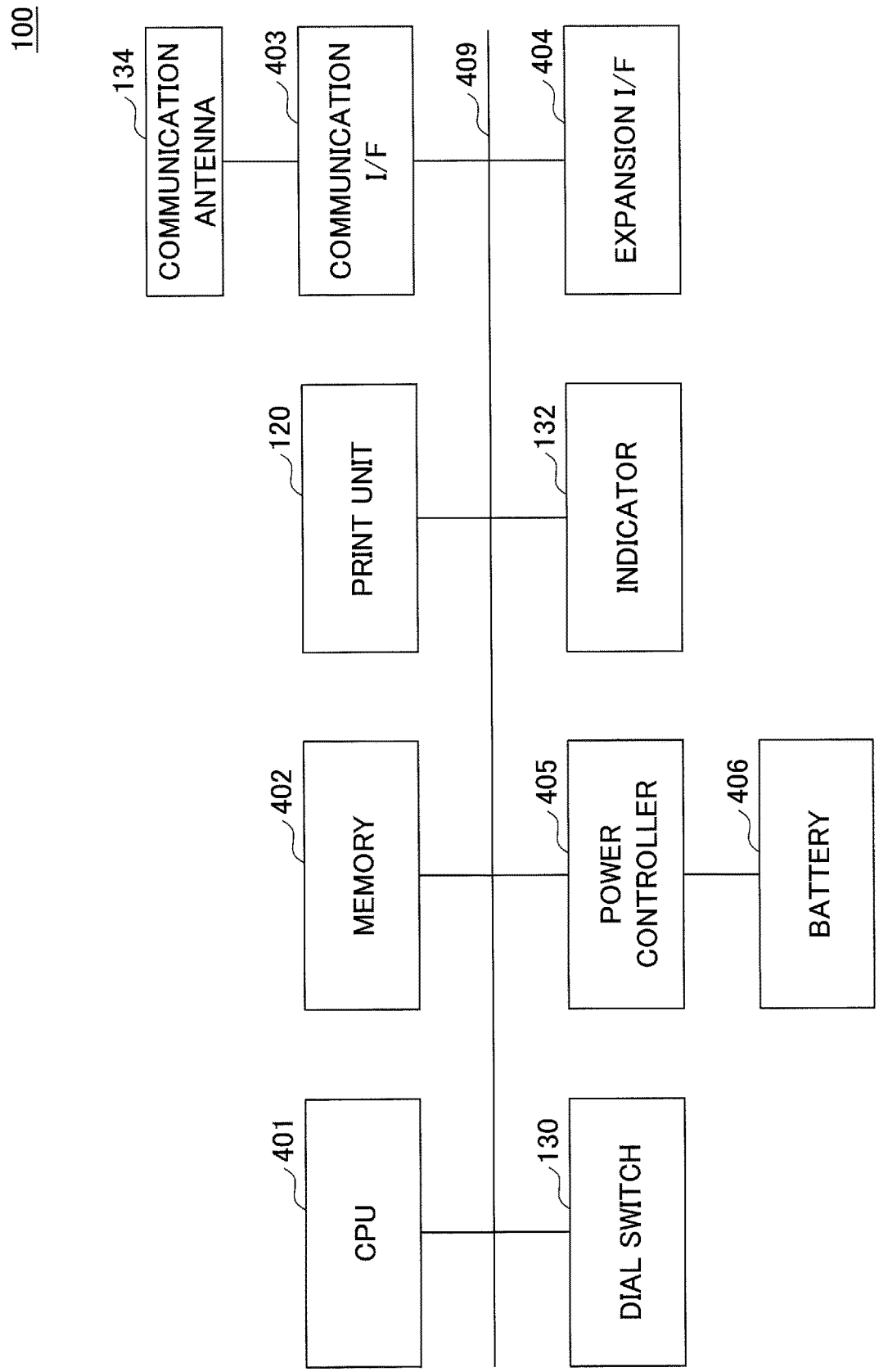
FIG. 4 is a block diagram illustrating a hardware structure of the printer in one embodiment.

FIG. 4 is a block diagram illustrating a hardware structure of the printer 100. As illustrated in FIG. 4, the printer 100 includes the CPU 401, a memory 402, the print unit 120, the antenna 134, a communication interface (I/F) 403, the dial switch 130, the indicator 132, an expansion interface (I/F) 404, a power controller 405, and a battery 406. Each of parts of the printer 100, including the CPU 401, the memory 403, the print unit 120, the communication I/F 403, the dial switch 130, the power controller 405, the indicator 132 and the expansion I/F 404 is connected via a bus 409.

The CPU 401 executes programs stored in the memory 402, and controls operations of the printer 100. The memory 402 stores the programs executed by the CPU 401, and data required by the CPU 401 to execute the programs. The memory 402 may be formed by a ROM (Read Only Memory) or a RAM (Random Access Memory) for example.

The communication I/F 403 controls wireless communication. In this embodiment, the communication I/F 403 employs, as the wireless communication system, the BLE having a relatively low power consumption. However, the wireless communication system is not limited to the BLE, and other communication systems, such as Wi-Fi, NFC (Near Field Communication) may be employed.

The expansion I/F 404 electrically connects to various cassettes that are mounted on the printer 100. The printer 100 may be mounted with cassettes other than the cassette 150. When a cassette functioning as an external power supply is mounted on the printer 100, the expansion I/F 404 electrically connects to the cassette and supplies the power from the cassette to the printer 100. In addition, when a cassette capable of selectively supplying an arbitrary kind of recording paper from a plurality kinds of recording paper is mounted on the printer 100, the expansion I/F 404 electrically connects to the cassette and outputs a signal instructing the kind of recording paper to the cassette.

The power controller 405 controls the power supply of the printer 100. The power controller 405 is interposed between the battery 406 and components of the printer 100, and controls the power supply according to the operation of the dial switch 130. The power controller 405 switches on and off states of the power supply of the printer 100.

The battery 406 supplies D.C. power to the components of the printer 100. In this embodiment, a chargeable secondary battery, such as a lithium-ion battery, a lithium-ion polymer battery or a nickel-hydrogen battery may be used as the battery 406. However, the battery 406 is not limited to secondary batteries, and a primary battery, such as a lithium battery may be used. The printer 100 can expose a USB (Universal Serial Bus) connector (not illustrated) by removing the cap 110B, and the battery 406 is charged by connecting the printer 100 to a charger via the USB connector.

The operation of the printer 100 will be described, by referring to FIG. 5 through FIG. 7.

Figure 5:
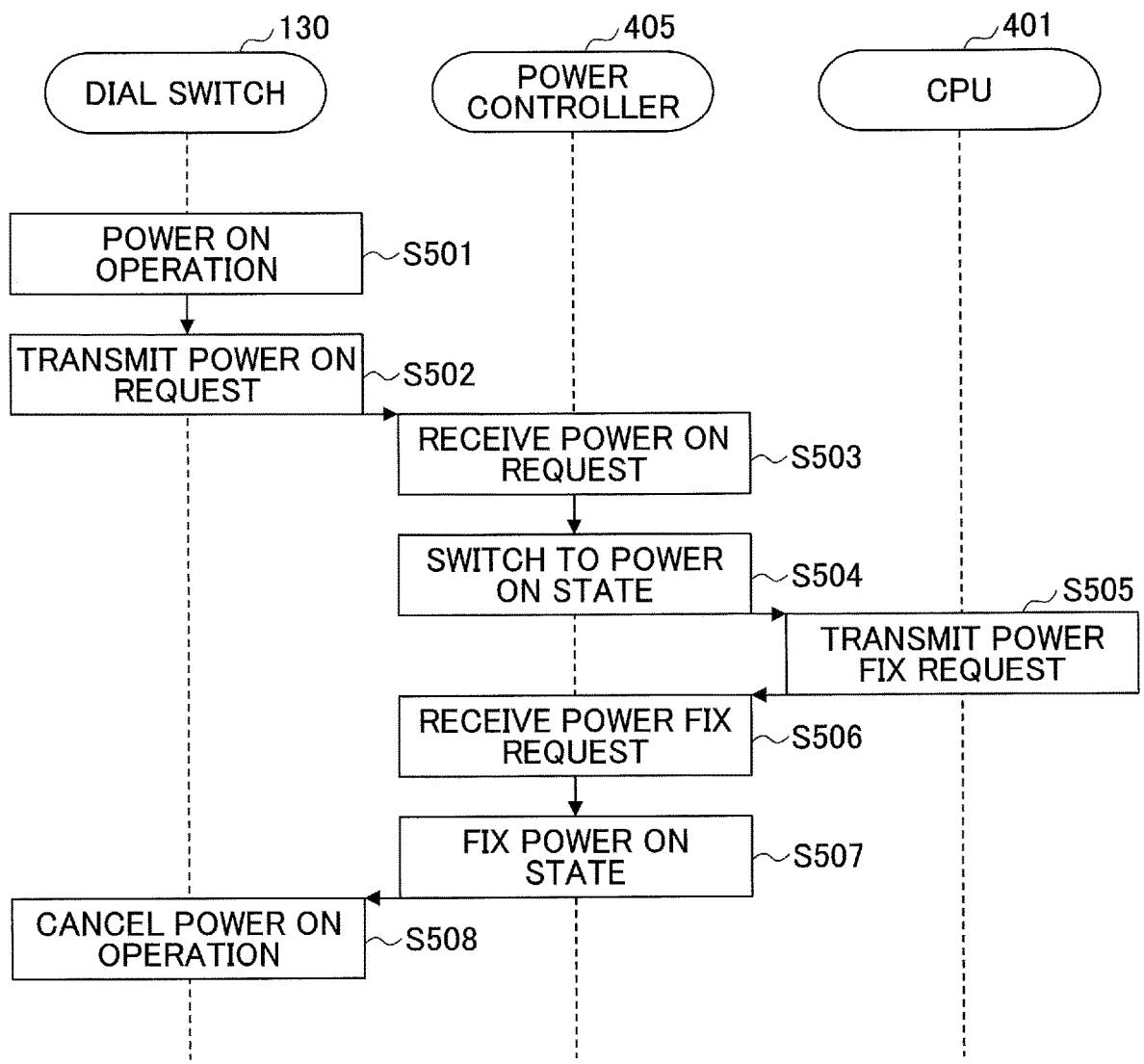
FIG. 5 is a sequence diagram illustrating procedures of a first operation of the printer.

FIG. 5 is a sequence diagram illustrating a first operation to turn on the power supply of the printer 100.

When a user presses the dial switch 130 to perform a power on operation when the power supply of the printer 100 is off (S501), the dial switch 130 transmits a power on request to the power controller 405 (S502). When the power controller 405 receives the power on request (S503), the power supply of the printer 100 is switched to the on state (S504), and the power from the battery 406 is supplied to the components of the printer 100. At this time, the power on state of the printer 100 is not fixed, and the power supply may stop when the dial switch 130 is no longer pressed within a predetermined time from the time when the dial switch 130 is pressed.

When the power on operation of the dial switch 130 continues for the predetermined time, the CPU 401 transmits a power fix request to the power controller 405 (S505). When the power controller 405 receives the power fix request (S506), the power on state of the printer 100 is fixed (S507). After S507, the power on state is not canceled even when the dial switch 130 is released from the pressed state (S508).

Figure 6:
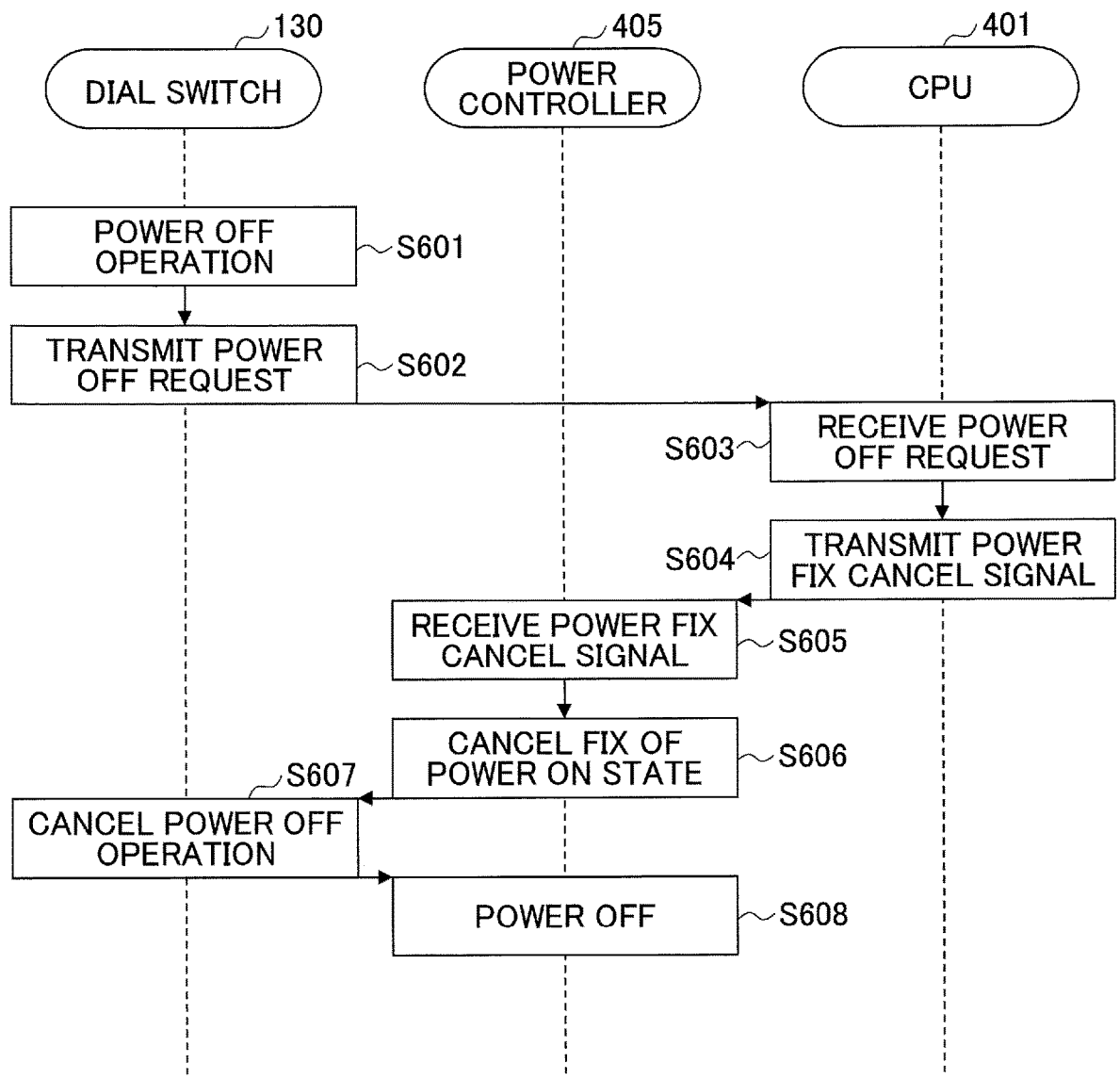
FIG. 6 is a sequence diagram illustrating procedures of a second operation of the printer.

FIG. 6 is a sequence diagram illustrating a second operation to turn off the power supply of the printer 100.

When the user presses the dial switch 130 to perform a power off operation while the power supply of the printer 100 is on (S601), the dial switch 130 transmits power off request to the CPU 401 (S602). Because the power off request is output while the dial switch 130 is pressed, the CPU 401 ends the process that is being executed at that time when the CPU 401 receives the power off request continuously for a predetermined time (S603), and transmits a power fix cancel signal to the power controller 405 (S604).

When the power controller 405 receives the power fix cancel signal (S605), the power controller 405 cancels the fixed power on state (S606). Thereafter, when the power off operation of the dial switch 130 is canceled (S607), the power controller 405 switches the printer 100 to the power off state (S608). By transmitting the power fix cancel signal only when the power off request continues for the predetermined time, the power supply is prevented from turning off when the dial switch 130 is operated carelessly, contrary to the user's intensions.

Figure 7:
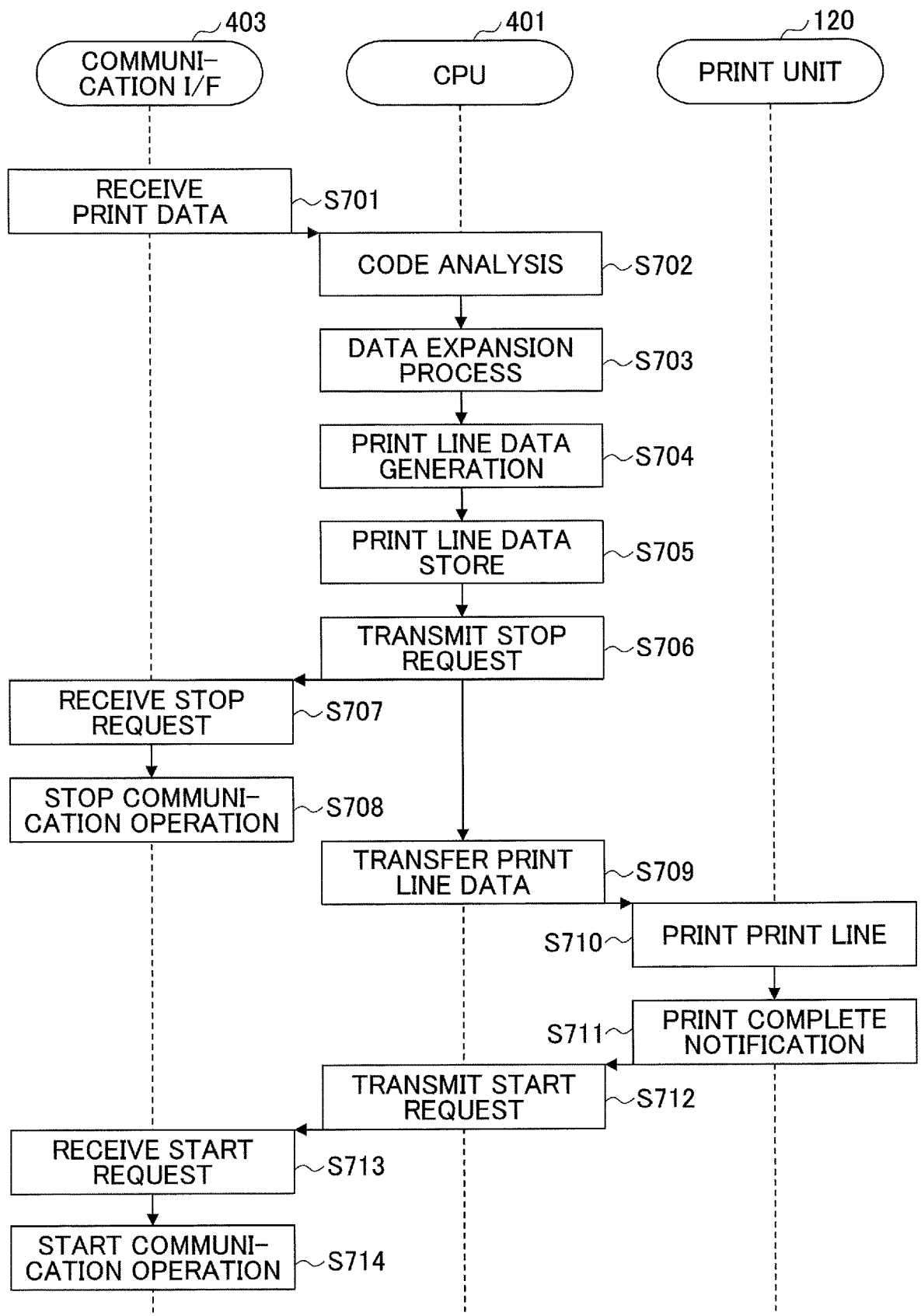
FIG. 7 is a sequence diagram illustrating procedures of a third operation of the printer.

FIG. 7 is a sequence diagram illustrating a printing operation of the printer 100 using the print data received from the external apparatus.

When the communication I/F 403 receives the print data from the external processing apparatus by wireless communication (S701), the CPU 401 performs a code analysis process on the received print data (S702), and performs a data expansion on the received print data (S703). Then, The CPU 401 generates print line data according to the print data received in S701 (S704). The CPU 401 stores the generated print line data into a buffer (S705).

Next, the CPU 401 transmits a stop request to stop communication operation to the communication I/F 403 (S706). When the communication I/F 403 receives the stop request (S707), the communication I/F 403 temporarily stops the wireless communication (S708). Accordingly, the printing by the print unit 120 is given a higher priority, and it is possible to prevent the printing from being disturbed by a communication interrupt to driving timings of the head and the motor.

The CPU 401 successively transfers the print line data stored in the buffer to the print unit 120 (S709) while the wireless communication is stopped. Then, the controller 125 controls the driving of the thermal head 121 based on the print line data transferred from the CPU 401 (S710).

When the printing is completed, the print unit 120 sends a print complete notification to the CPU 401 (S711). When the CPU 401 receives the print complete notification, the CPU 401 transmits a communication start request to the communication I/F 403 (S712). When the communication I/F 403 receives the start request from the CPU 401 (S713), the communication I/F 403 starts the wireless communication (S714), and the communication I/F 403 can resume the reception of the print data from the external apparatus.

Figure 8:
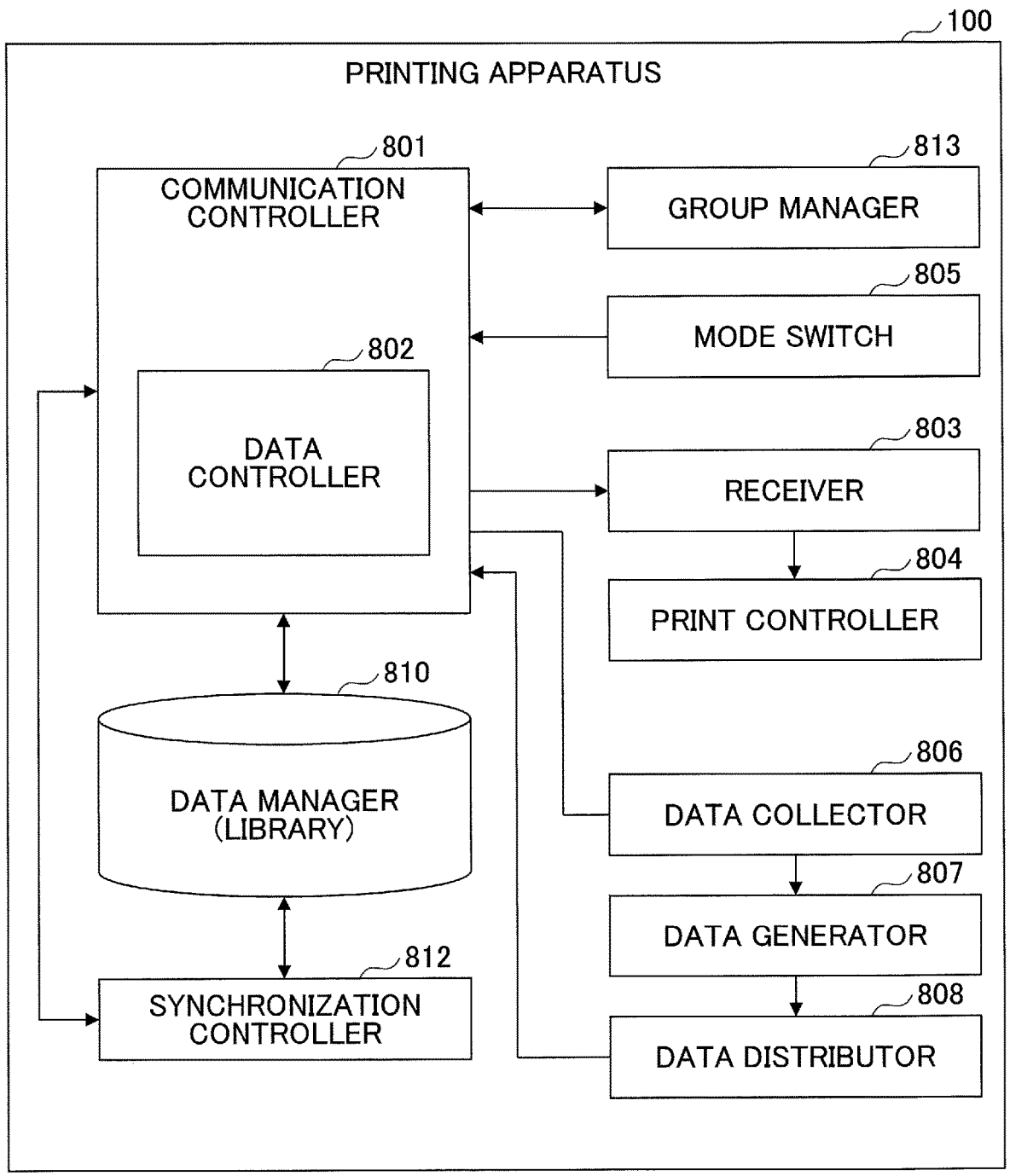
FIG. 8 is a block diagram illustrating a functional structure of the printer.

FIG. 8 is a block diagram illustrating a functional structure of the printer 100.

As illustrated in FIG. 8, the printer 100 includes a communication controller 801, a data controller 802, a receiver 803, a print controller 804, a mode switch 805, a data collector 806, a data generator 807, a data distributor 808, a data manager 810, a synchronization controller 812, and a group manager 813.

The communication controller 801 controls the intergroup communication between the printer 100 and other apparatuses forming the group, such as smartphones, other printers and sensor devices. For example, the communication controller 801 performs the following control operations (1) through (5) related to the intergroup communication.

(1) Communication connection with the other apparatus using BLE communication;

(2) Pairing with the other apparatus using the BLE communication; and (3) Data transmission and reception with the other apparatus using the BLE communication.

In this embodiment, the communication controller 801 performs the data transmission and reception with the other apparatus, using context data for the intergroup communication generated by the data controller 802.

(4) Setting access authority (group ID and user ID) to context data transmitted to the other apparatus; and (5) Determining the access authority of the context data received from the other apparatus.

The data controller 802 controls the data used for the intergroup communication. The data controller 802 uses data managed by the data manager 810, and generates context data having a predetermined data structure. For example, when the data controller 802 transmits the object such as image data or character data to the other apparatus and causes the other apparatus to output the object, the data controller 802 generates the context data. The context data generated by the data controller 802 includes an identifier of the object, and an identifier of position information indicating an output position of the object at the time of the printing or display. The position information may include an output position on the recording paper or on a display screen. In addition, the communication controller 801 transmits the generated context data to the other apparatus. The other apparatus identifies the object to be output and the output position of the object from the identifiers included in the received context data. When the other apparatus prestores, in a library thereof, the object to be output and the identifier of the object, and the output position of the object and the identifier of the output position, the communication controller 801 does not need to transmit actual data of the object and the position information, and need only transmit the context data identified by the identifiers to the other apparatus. The other apparatus uses the received identifiers to read the object and the position information stored the library thereof. Hence, it is possible to reduce the amount of data transmitted from the printer 100 to the other apparatus.

The receiver 803 receives the print data via the intergroup communication from the other apparatus forming the group with the printer 100.

The print controller 804 controls the printing by the print unit 120, using the print data received by the data receiver 803.

The mode switch 805 switches the operation mode of the printer 100 between a master mode in which the printer 100 is a master device in the intergroup communication, and a slave mode in which the printer 100 is a slave device. For example, the mode switch 805 switches the operation mode of the printer 100 according to the operation of the dial switch 130. The printer 100 may initially operate in the slave mode, and be switched to the master mode by the mode switch 805 when the dial switch 130 is operated. Details of the process performed by the mode switch 805 will be described later in conjunction with FIG. 29 through FIG. 32.

The operation mode of the printer 100 is maintained even when the power supply is turned off. When the power supply is turned off when the printer 100 is in the master mode, the printer 100 starts in the master mode when the power supply is turned back on. On the other hand, when the power supply is turned off when the printer 100 is in the slave mode, the printer is started in the slave mode when the power supply is turned back on. In addition, when an operation to turn off the power of the printer 100 is performed while a mode switch operation is being performed, the power supply is not turned off immediately. The printer 100 temporarily maintain the fixed power on state for an initializing operation, and during this time, positively switching the operation mode and notify the user of a switch completion using the indicator 132, before turning off the power supply.

When the printer 100 is in the master mode, the data collector 806 collects the data for the application using the context data from the other slave printer forming the same group as the printer 100 via the intergroup communication. For example, the data collector 806 collects the data for a print application or the data for a SNS application from each of the other slave printers belonging to the same group as the printer 100.

The data generator 807 generates output data for the application, using the data collected by the data collector 806. For example, the data generator 807 generates the output data for the print application or the output data for the SNS application using the data collected by the data collector 806.

The data distributor 808 distributes the output data generated by the data generator 807 to the slave printer. For example, the data distributor 808 distributes the output data for the print application or for the SNS application generated by the data generator 807 to each of the slave printers.

The data manager 810 is a library that manages various data used for the context data. For example, the data manager 810 manages the following data. Details of each of the following data will be described later in conjunction with FIG. 9.

(1) The object that is transmitted and received among the groups by the context data;

(2) Identification information (@POS) of each position information;

(3) Position set information that is an aggregate of the position information;

(4) Identification information (@SPOS) of each position set information;

(5) Character data transmitted and received among the groups by the context data;

(6) Identification information (@LST) of each character data;

(7) Modifier information of the character data transmitted and received among the groups by the context data;

(8) Identification information (@MOD) of each modifier information;

(9) Image data transmitted and received among the groups by the context data;

(10) Identification information (@FLM, @BLK, @UPT) of each image data;

(11) ZIP information defining combination of element information ((1) to (10) above);

(12) Identification information (@ZIP) of each ZIP information;

(13) Mapping information defining the expansion process performed by an information processing apparatus at a transmitting destination of the context data; and

(14) Identification information (@MAP) of each mapping information.

The synchronization controller 812 controls synchronization of the libraries among the information processing apparatuses forming the groups. The synchronization controller 812 transmits local data stored in the library (data manager 810) of the printer 100 to which the synchronization controller 812 belongs, to the other apparatus. The local data of the printer 100 refers to data stored only in the library thereof. Examples of the local data include information such as element information, combining information, and expansion information used for the context data. In addition, the synchronization controller 812 stores the local data transmitted from the other apparatus in the library thereof. Hence, the local data stored in the printer 100 is stored in the other apparatus, and the local data stored in the other apparatus is stored in the printer 100. As a result, the libraries among the information processing apparatuses, including the printer 100, are synchronized.

The group manager 813 manages the groups. The group manager 813 manages, for each of predefined groups, the group ID, and the user belonging to the group, that is, the user ID of the user permitted to participate to the group, according to a management table. The printer 100 switches to the master mode via operation of the dial switch 130, for example. In addition, the printer 100 in the master mode selects the group to be used for the intergroup communication, from among the predefined groups managed by the group manager 813. Further, the master printer 100 forms the group by connecting to the other slave apparatus belongs to the selected group.

The functions of the printer 100 described above may be performed by the CPU 401 that executes the programs stored in the memory 402. The programs executed by the CPU 401 may be preinstalled in the printer 100, or provided to the printer 100 from the outside. In the latter case, the programs may be provided by an external storage medium such as a USB memory, a memory card, or a CD-ROM (Compact Disk-Read Only Memory). The programs may be downloaded to the printer 100 from a server via a network, for example. The programs that are provided may be temporarily stored in the portable terminal, which will be described later, and is downloaded to the printer 100 from the portable terminal. The CPU 401 may store the programs in the memory 402, and restart to start the downloaded programs.

(Data Structure of Context Data)

FIG. 9 is a diagram illustrating a data structure of the context data used by the printer 100. As illustrated in FIG. 9, the context data includes a header and a data region (field definition information).

<Header>

The header includes a "granted ID" and an "attribute information". The "granted ID" includes "context ID" as a data item. The "attribute information" includes "group ID" and "user ID", as data items that enable a hierarchical shared group setting.

A context ID of the user terminal uniquely identifying the context data is set to the "context ID". For example, the context ID is numbered when the context data is generated.

Information related to the group sharing the context data is set to the "group ID". An "enable flag" indicating whether to enable access to the context data, a "group classification" indicating a hierarchical rank or level of the group enabled or disabled access to the context data, and a "group ID" uniquely identifying the group are set to the "group ID information". For example, "0" indicating disable or "1" indicating enable is set to the enable flag. One of "00", "01", "10", and "11" is set to the group classification. For the group classification, "00" indicates free, "01" indicates a small group, "10" indicates a medium group, and "11" indicates a large group. The group ID of one or more groups subject to the context data is set to the "group ID". A total of 32 groups can be classified when the group ID has 5 bits. The group ID that is set to the context data may be appropriately changed. For example, when conducting a group activity using the context data at an education site, the group ID of the small group may be set when sharing the context data in a unit of the group at first. Thereafter, the group ID of the large group may be set when sharing the context data in a unit of a class. The context data is shared by the same group ID, but is not shared among different group IDs. The "group classification" can further classify the user group or sensor group. The enabling/disabling of one or more groups may be set according to the hierarchical rank or hierarchical group.

When the master printer 100 distributes the context data to the other printer within the same group, the group ID and the enable flag "1" is set to the context data. The user ID of a certain member who belongs to the same group as the printer 100 and the enable flag "0" is set to, if access to the context data by this member is to be prohibited. The other printer determines the group from the group ID, and determines the enable flag. When the enable flag "1" is set to the received context data, and the other printer is a member of the same group, the access to the context data is permitted. However, the access to the context data is prohibited when the enable flag "0" is set to the received context data.

An "enable flag" indicates whether to permit access to the context data, and a "user ID" uniquely identifying the user who is enabled or disabled access to the context data, are set to the "user ID information". For example, "0" indicating disable or "1" indicating enable is set to the "enable flag". The user ID of one or more users subject to the context data is set to the "user ID".

<Data Region>

The "data region" includes "element", "combination", and "expansion", as data items.

"Position", "position set", "list", "modifier", "frame image", "block image", and "unit image" are set to the "element". The element information has no order-dependency.

In the followings, the identifiers and corresponding information are managed by the data manager 810.

An identifier identifying the output position of the object transmitted by the context data is set to the "position". The output position may include coordinate values and region size. The object may include the character data and the image data. "@POS" is the identifier that is set to the "position". When "@POS(A)" is set to the context data, an output target object is output to the output position "@POS(A)" of the application.

An identifier identifying position set information that is an aggregate of the position information is set to the "position set". "@SPOS" is the identifier that is set to the "position set". When "@SPOS(A)" is set to the context data, the output target object is output to the output position "@SPOS(A)" of the application. For example, when registering the character information, one unit pattern may be pasted to a plurality of positions identified by the position set information.

An identifier identifying text data transmitted by the context data is set to the "list". The text data may include a code string to be printed on demand. "@LST" is the identifier that is set to the list information.

A identifier identifying modifier information of the character data transmitted by the context data is set to the "modifier". The character data may include the character type, character size, and rotation information. "@MOD" is the identifier that is set to the "modifier".

An identifier identifying frame image data transmitted by the context data, such as when newly registering the frame image, is set to the "frame image". "@FLM" is the identifier that is set to the "frame image".

An identifier identifying block image data, including logo and character, transmitted by the context data, such as when newly registering the block image, is set to the "block image". "@BLK" is the identifier that is set to the "block image".

An identifier identifying unit pattern image data transmitted by the context data when registering a newly generated unit pattern, such as when making a character registration, is set to the "unit image". "@UPT" is the identifier that is set to the "unit image".

An identifier identifying ZIP information defining the combination of the element information is set to the data item "combination". "@ZIP" is the identifier that is set to the "combination". The ZIP may be made to different position designation (POS) numbers for the same attribute designation (MOD) number. Alternatively, the ZIP may be made to the same POS number for the same MOD number. However, the ZIP numbers are different. The combining operation has no order-dependency.

When "@ZIP(A)" is set to the context data as the "combination", and "@ZIP(A)" defines a combination of "@POS(A)" and "@MOD(A)", the output target character data is output to the output position "@POS(A)" of the application, by the modifier information "@MOD(A)".

When "@ZIP(B)" is set to the context data as the "combination", and "@ZIP(B)" defines a combination of "@SPOS(B)" and "@UPT(B)", the unit pattern image data "@UPT(B)" is output to a plurality of output positions "@SPOS(B)" of the application.

An identifier identifying mapping information that defines the expansion process performed in the information processing apparatus at the transmitting destination of the context data, is set to the "expansion". "@MAP" is the identifier that is set to the "mapping". The op function has order-dependency.

When "@MAP(A)" is set to the context data as the "expansion", "@MAP(A)" defines the combination of "op", "@ZIP(A)", and "@LST(A)", and "@ZIP(A)" defines the combination of "@POS(A)" and "@MOD(A)", an expansion process corresponding to "op" is performed to output the character data "@LST(A)", as the modifier information "@MOD(A)", to the output position "@POS(A)" of the application by the information processing apparatus at the transmitting destination.

In addition, when "@MAP(B)" is set to the context information as the "expansion", and "@MAP(B)" defines the combination of "op", "@POS(B)", and "@FLM(B)", an expansion process corresponding to "op" is performed to output the frame image data "@FLM(B)", to the output position "@POS(B)" of the application by the information processing apparatus at the transmitting destination.

Further, when "@MAP(C)" is set to the context information as the "expansion", and "@MAP(C)" defines the combination of "op", "@POS(C)", and "@BLK(C)", an expansion process corresponding to "op" is performed to output the block image data "@BLK(C)", to the output position "@POS(C)" of the application by the information processing apparatus at the transmitting destination.

When "@MAP(D)" is set to the context information as the "expansion", and "@MAP(D)" defines the combination of "op", "@IDX(D)", and "@ZIP(D)", an expansion process corresponding to "op" is performed to register the image data, such as the character or the like identified by "@ZIP(D), at the index "@IDX(D) by the information processing apparatus at the transmitting destination.

Accordingly, the printer 100 can share an object that is displayed on the screen, printed, or the like, among other apparatuses, by transmitting and receiving the context data with the other apparatuses. Particularly, this embodiment includes the identifier of the object in the context data, so that the object can be output to the other apparatus at the transmitting destination, without transmitting and receiving the actual data of the object by the printer 100. Hence, the printer 100 can reduce the amount of data transmitted and received with the other apparatuses.

First Embodiment

The printer 100 in a first embodiment will be described, by referring to FIG. 10 through FIG. 12. In the first embodiment, an example of a communication system 10 is described. The printer 100 and a smartphone 200 (an example of the "portable terminal") that perform the intergroup communication form the communication system 10.

(Mounting Smartphone 200 to Printer 100)

Figure 10:
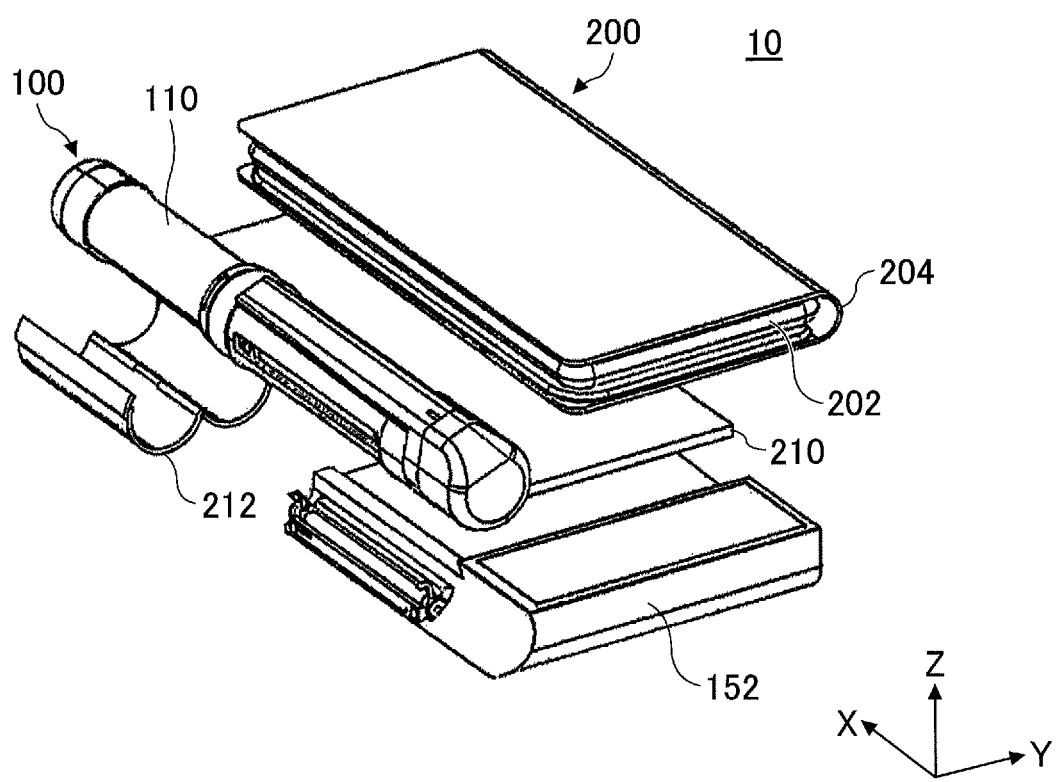
FIG. 10 is a perspective view illustrating a separated state of the printer and a smartphone in a first embodiment.
Figure 11:
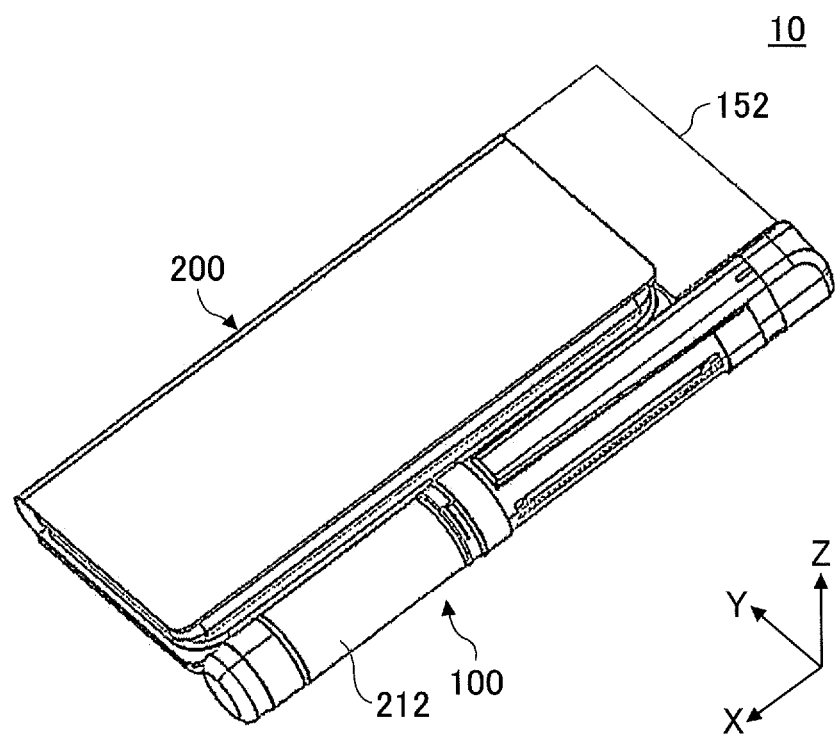
FIG. 11 is a perspective view illustrating a connected state of the printer and the smartphone.

FIG. 10 is a perspective view illustrating a separated state of the printer 100 and the smartphone 200 in the first embodiment. FIG. 11 is a perspective view illustrating a connected state of the printer 100 and the smartphone 200.

As illustrated in FIG. 10, the printer 100 is attached to the smartphone 200 via a binder 210. The smartphone 200 includes the main body 202, and a jacket 204 that is mounted to cover the main body 202. The plate-shaped binder 210 may be mounted on a rear surface of the jacket 204 by a fixing means such as an adhesive agent. The binder 210 has rectangular shape. A cylindrical holder 212, extending along the long side of the binder 210, is provided at the −Y side. The holder 212 can be opened and closed, and the printer 100 can be opened, as illustrated in FIG. 10. The printer 100 can be fixedly held by closing the holder 212 as illustrated in FIG. 11. An inner diameter of the holder 212 is approximately the same as the outer shape of the casing 110. Accordingly, the holder 212 can hold the printer 100 without looseness. As illustrated in FIG. 11, the cassette 152 or other expansion cassettes may be mounted on the printer 100 in the state in which the printer 100 is attached to the smartphone 200. In addition, the recording paper and a built-in battery may be provided inside the cassette 152. By mounting the cassette 152 on the printer 100 that is attached to the smartphone 200, it is possible to perform the printing in the state in which the printer 100 is attached to the smartphone 200.

The printer 100 can perform the intergroup communication with the smartphone 200 by the BLE communication. In addition, the printer 100 can perform the printing using the print data received from the smartphone 200 via the intergroup communication. Further, the printer 100 can perform the intergroup communication to download the data from the smartphone 200 and record the data in the memory 402, and also upload the various local data recorded in the memory 402 to the smartphone 200.

In the first embodiment, the smartphone 200 is a master device and the printer 100 is a slave device in the intergroup communication. In the first embodiment, the printer 100 may be switched to the slave mode by the mode switch 805 to perform the intergroup communication with the smartphone 200. Moreover, the printer 100 may use the context data to transmit and receive the data with the smartphone 200.

In the followings, "library" without sign means the library of the printer 100, and with sign "A, B, . . . " means the library of the other apparatuses.

(Printing Process by Communication System 10)

Figure 12:
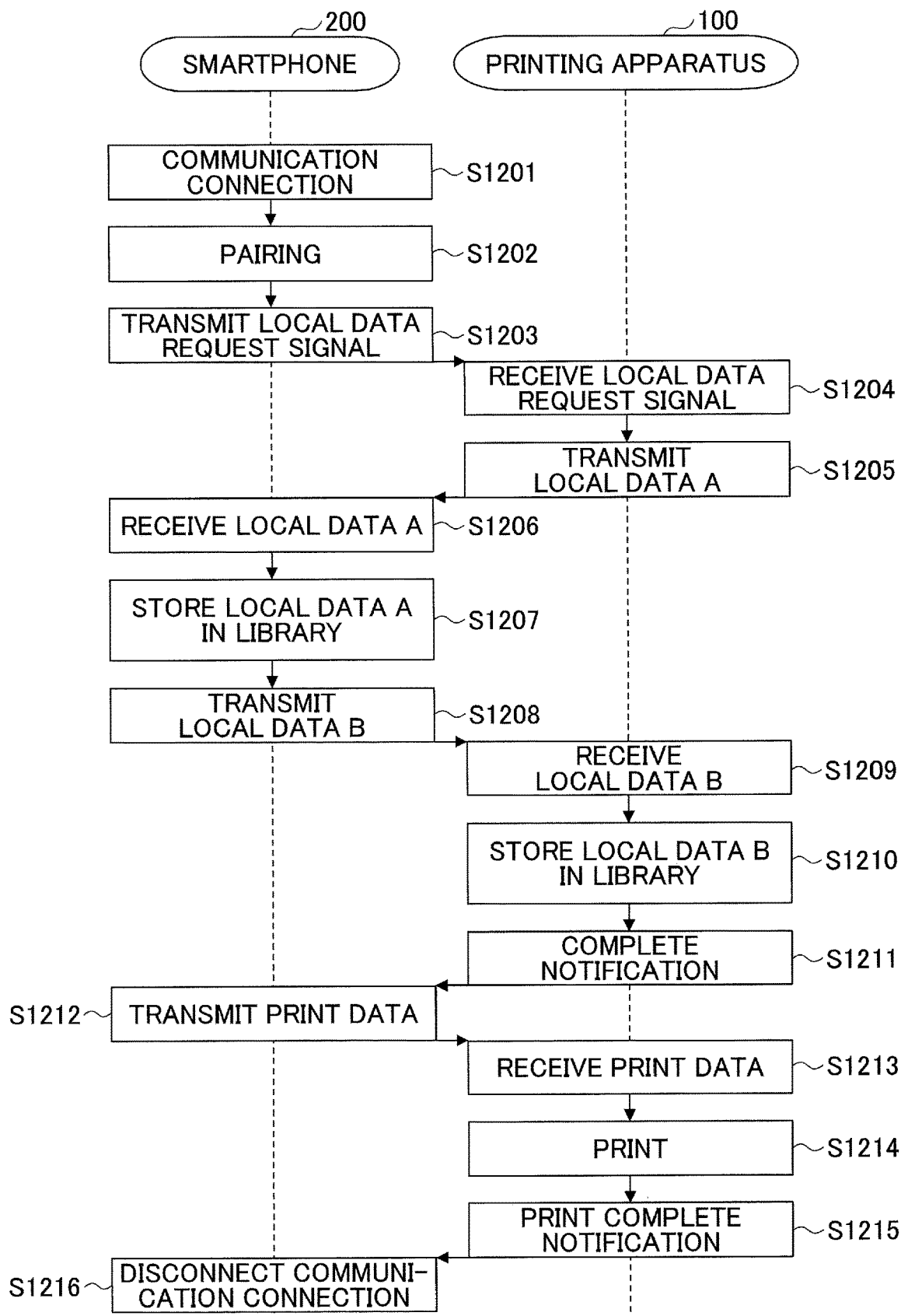
FIG. 12 is a sequence diagram illustrating a printing process in the first embodiment.

FIG. 12 is a sequence diagram illustrating the printing process of the communication system 10 in the first embodiment. A description will be given of the procedures of the printing process of the printer 100 based on the print data output from the smartphone 200.

First, the smartphone 200 performs a communication connection for the wireless communication with the printer 100 (S1201), then performs a pairing with the printer 100 (S1202). Next, the smartphone 200 transmits a local data request signal to the printer 100 (S1203).

When the communication controller 801 receives the local data request signal from the smartphone 200 (S1204), the synchronization controller 812 transmits the local data A stored in the library (data manager 810) of the printer 100 to the smartphone 200 via the communication controller 801 (S1205).

When the smartphone 200 receives the local data A from the printer 100 (S1206), the smartphone 200 stores the received local data A in the library thereof (S1207), similarly to the storing of the local data A in the printer 100. Hence, the local data A stored in the library is also stored in the library A of the smartphone 200.

Next, the smartphone 200 transmits the local data B stored in the library A to the printer 100 (S1208).

When the communication controller 801 receives the local data B from the smartphone 200 (S1209), the synchronization controller 812 stores the received local data B in the library (S1210). Hence, the local data B stored in the library A is also stored in the library.

The synchronization controller 812 sends a complete notification to the smartphone 200 via the communication controller 801 (S1211). When the smartphone 200 receives the complete notification, the smartphone 200 transmits the print data to the printer 100 (S1212).

When the communication controller 801 receives the print data from the smartphone 200 (S1213), the print controller 804 controls the print unit 120 using the print data to print the print data (S1214). When the printing is completed, the print controller 804 sends a print complete notification to the smartphone 200 via the communication controller 801 (S1215).

When the smartphone 200 receives the print complete notification, the smartphone 200 disconnects the communication connection with the printer 100 (S1216).

For example, the smartphone 200 transmits the context data to which the identifiers, such as the identifier for identifying the object to be printed and the identifier for identifying the print position are set, to the printer 100, as the print data. When the printer 100 receives the context data, the printer 100 identifies the object to be printed and the print position from the identifiers set to the received context data. The printer 100 synchronizes in advance the library with the library A, so that the object to be printed is stored. For this reason, the printer 100 can print the object without receiving the object from the smartphone 200.

Second Embodiment

The printer 100 in a second embodiment will be described, by referring to FIG. 13 and FIG. 14. In the second embodiment, an example of a communication system 10A is described. The printer 100 and two smartphones 200A and 200B that perform the intergroup communication, form the communication system 10A.

(Communication System 10A)

Figure 13:
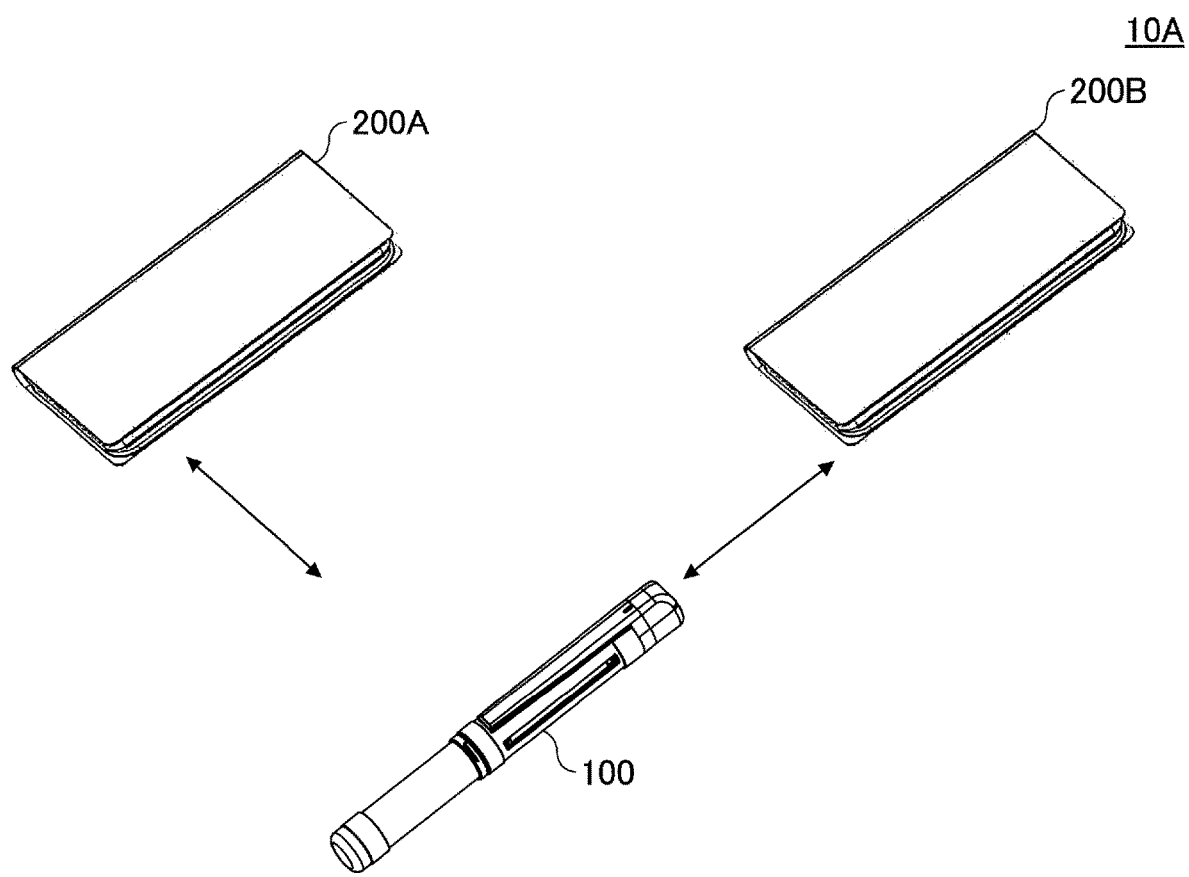
FIG. 13 is a diagram illustrating the communication system in a second embodiment.

FIG. 13 is a diagram illustrating the communication system 10A in the second embodiment. The printer 100 in the second embodiment performs the intergroup communication with the smartphones 200A and 200B by the BLE communication. In addition, the printer 100 performs the printing using the print data received from each of the smartphones 200A and 200B via the intergroup communication. Further, the printer 100 performs the intergroup communication to upload the various local data recorded in the memory 402 to at least one of the smartphones 200A and 200B.

In the second embodiment, each of the smartphones 200A and 200B is a master device, and the printer 100 is a slave device with respect to each of the smartphones 200A and 200B, in the intergroup communication. Each of the smartphones 200A and 200B includes functions similar to the functions of the smartphone 200 in the first embodiment. The printer 100 performs the intergroup communication similar to that of the first embodiment, with each of the smartphones 200A and 200B.

(Synchronization Process)

Figure 14:
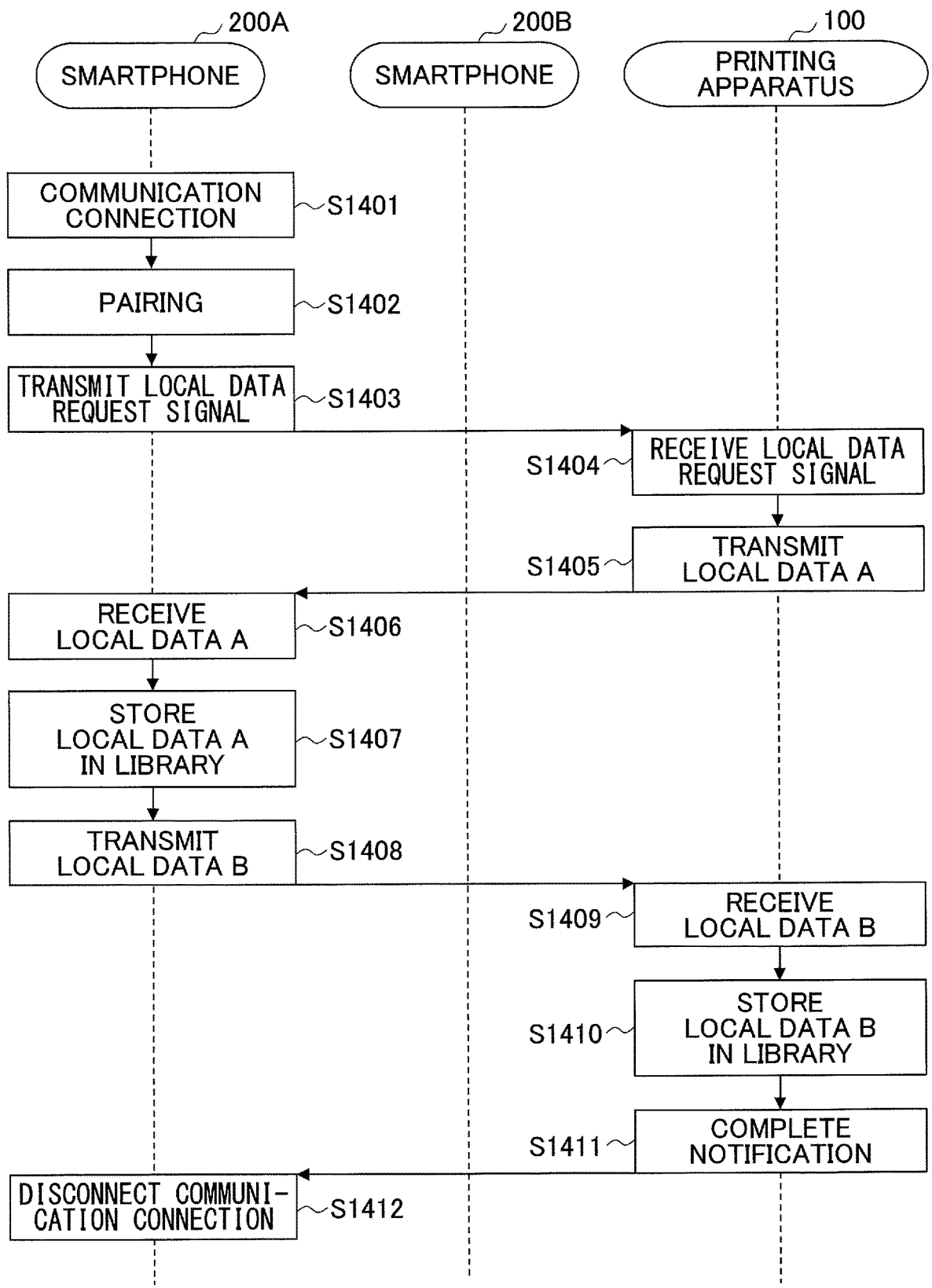
FIG. 14 is a sequence diagram illustrating a synchronization process in the second embodiment.

FIG. 14 is a sequence diagram illustrating a synchronization process of the communication system 10A. The the synchronization process of the communication system 10A, performed between the smartphone 200A and the printer 100, when the smartphone 200A and the printer 100 temporarily forms a group, will be described.

First, the smartphone 200A performs a communication connection for the BLE communication with the printer 100 (S1401), and then performs a pairing with the printer 100 (S1402). Next, the smartphone 200A transmits a local data request signal to the printer 100 (S1403).

When the printer 100 receives the local data request signal from the smartphone 200A (S1404), the synchronization controller 812 transmits the local data A stored in the library (data manager 810) to the smartphone 200A via the communication controller 801 (S1405).

When the smartphone 200A receives the local data A from the printer 100 (S1406), the smartphone 200A stores the received local data A in the library A (S1407). Hence, the local data A stored in the library is also stored in the library A.

Next, the smartphone 200A transmits the local data B stored in the library A to the printer 100 (S1408).

When the printer 100 receives the local data B from the smartphone 200A (S1409), the synchronization controller 812 stores the received local data B in the library (S1410). Hence, the local data B stored in the library A is also stored in the library.

The synchronization controller 812 sends a complete notification to the smartphone 200A via the communication controller 801 (S1411). When the smartphone 200A receives the complete notification, the smartphone 200A disconnects the communication with the printer 100 (S1416). The smartphone 200B may be synchronized with the printer 100, similarly to the above described synchronization of the smartphone 200A.

The printer 100 may receive the data from one of the smartphones 200A and 200B, and transmit the received data to the other of the smartphones 200A and 200B, to provide a data relay between the smartphones 200A and 200B.

Third Embodiment

The printer 100 in a third embodiment will be described, by referring to FIG. 15 and FIG. 16. In the third embodiment, an example of a communication system 10B is described. The printer 100 and two other printers 100A and 100B that perform the intergroup communication, form the communication system 10B.

In the following, elements of the printer 100 are designated by reference numerals only with no symbol affixed thereto, elements of the printer 100A are designated by the same reference numerals as the printer 100 but with a symbol "A" affixed thereto, and elements of the printing printer 100B are designated with a symbol "B" affixed thereto.

(Communication System 10B)

Figure 15:
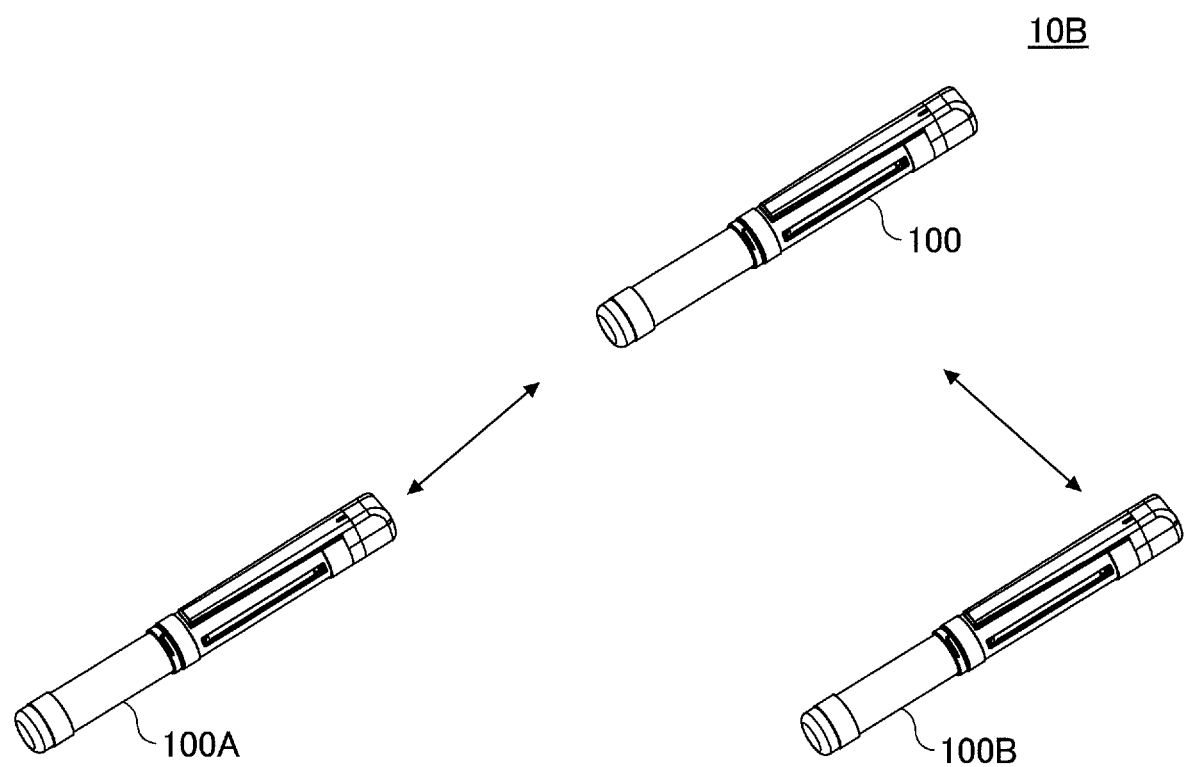
FIG. 15 is a diagram illustrating the communication system in a third embodiment.

FIG. 15 is a diagram illustrating the communication system 10B in the third embodiment. The printer 100 in the third embodiment performs the intergroup communication with the printers 100A and 100B by the BLE communication. In addition, the printer 100 collects various data, including the local data and posted data of the SNS application, from each of the printers 100A and 100B, and distributes data to the printers 100A and 100B. In the third embodiment, the printer 100 is a master device and each of the printers 100A and 100B is a slave device in the intergroup communication. Each of the printers 100A and 100B includes functions similar to the functions of the printer 100. Accordingly, each of the printers 100A and 100B also performs the printing and the intergroup communication.

Further, each of the printers 100A and 100B performs the intergroup communication with a smartphone, similarly to the printer 100, and may also be a master device.

In FIG. 15, the printer 100 forms the group together with the two printers 100A and 100B. However, the printer 100 may form a group together with one printer or three or more printers.

(Synchronization Process)

Figure 16:
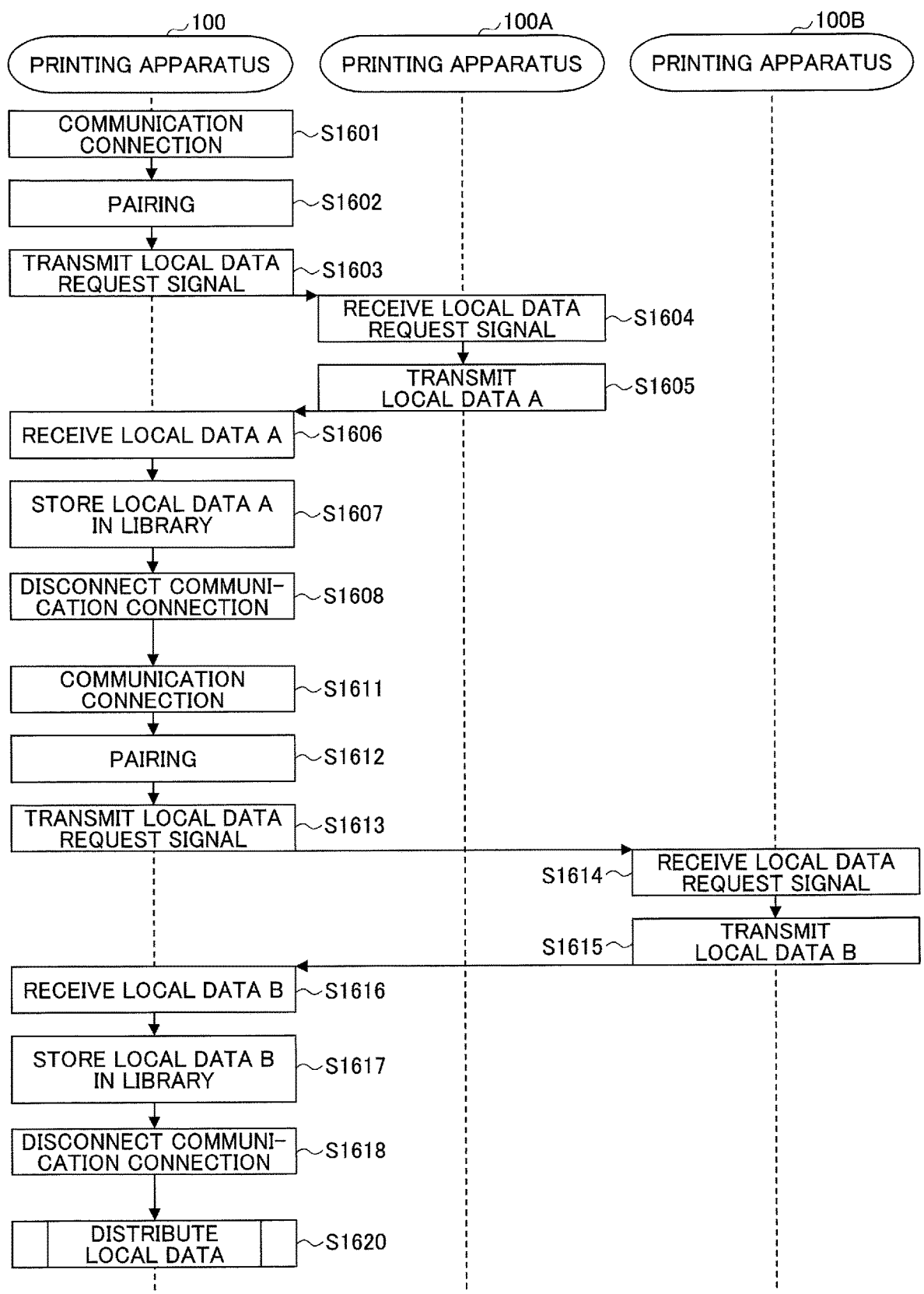
FIG. 16 is a sequence diagram illustrating the synchronization process in the third embodiment.

FIG. 16 is a sequence diagram illustrating the synchronization process of the communication system 10B. The the synchronization process of the communication system 10B, performed between the printer 100 and the printers 100A and 100B, when the printer 100 is a master device, will be described.

First, the communication controller 801 performs a communication connection for the BLE communication with the printer 100A (S1601), and performs a pairing with the printer 100A (S1602). Next, the synchronization controller 812 transmits a local data request signal to the printer 100A via the communication controller 801 (S1603).

When the communication controller 801A receives the local data request signal from the printer 100 (S1604), the synchronization controller 812A transmits the local data A stored in the library (data manager 810A) to the printer 100 via the communication controller 801A (S1605).

When the communication controller 801 receives the local data A from the printer 100A (S1606), the synchronization controller 812 stores the received local data A in the library (S1607), similarly to the storing of the local data A in the library A of the printer 100A. Hence, the local data A stored in the library A is also stored in the library. Thereafter, the communication controller 801 disconnects the communication with the printer 100A (S1608).

Next, the communication controller 801 performs a communication connection for the BLE communication with the printer 100B (S1611), and performs a pairing with the printer 100B (S1612). Next, the synchronization controller 812 transmits a local data request signal to the printer 100B via the communication controller 801 (S1613).

When the communication controller 801B receives the local data request signal from the printer 100 (S1614), the synchronization controller 812B transmits the local data B stored in the library B (data manager 810B) to the printer 100 via the communication controller 801B (S1615).

When the communication controller 801 receives the local data B from the printer 100B (S1616), the synchronization controller 812 stores the received local data B in the library (S1617), similarly to the storing of the local data B in the library B. Hence, the local data B stored in the library B is also stored in the library of the printer 100. Thereafter, the communication controller 801 disconnects the communication with the printer 100B (S1618).

Next, the printer 100 distributes the local data to each of the printers 100A and 100B (S1620). Details of the local data distribution process will be described later in conjunction with FIG. 17.

(Local Data Distribution)

Figure 17:
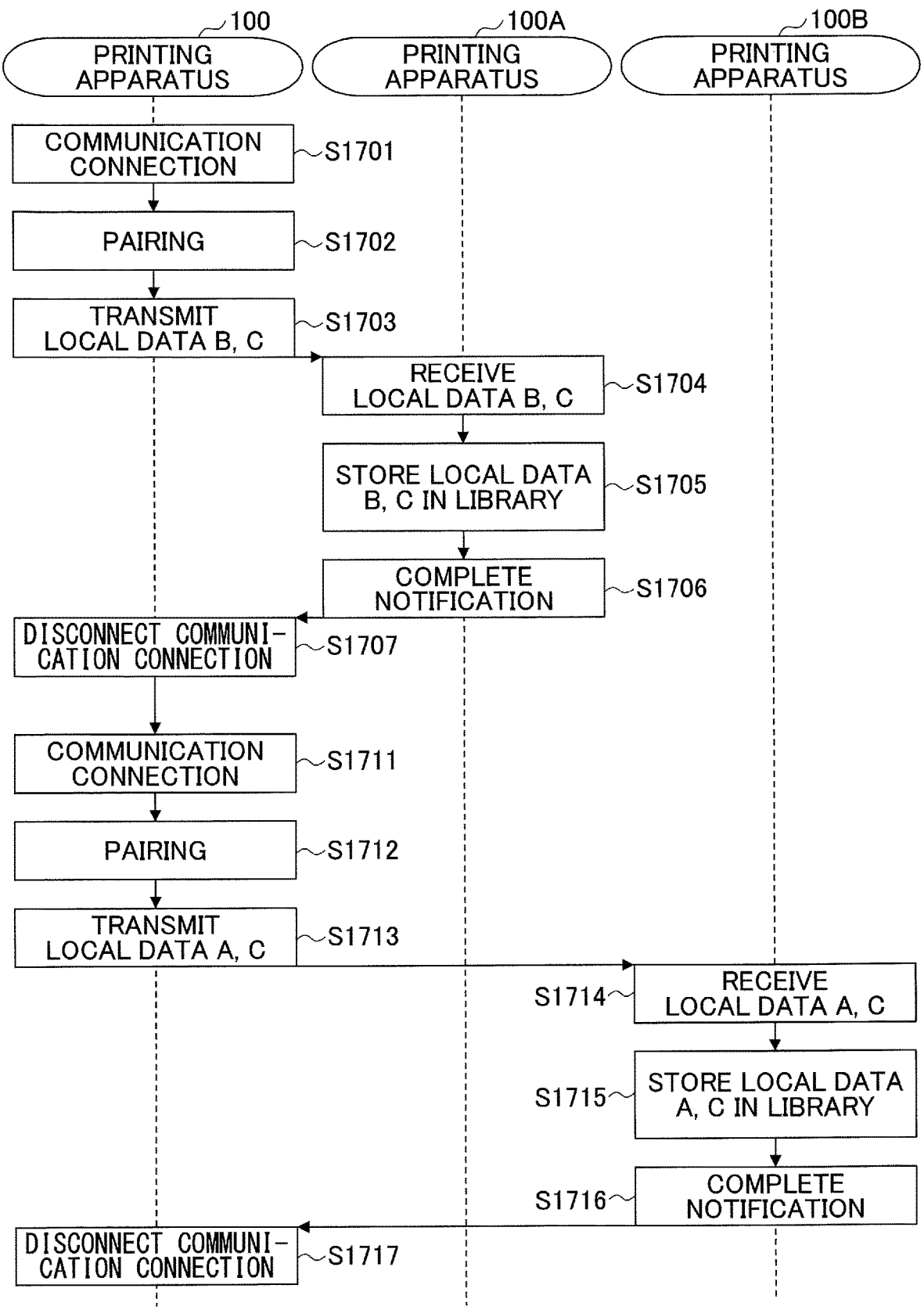
FIG. 17 is a sequence diagram illustrating a local data distribution process in the third embodiment.

FIG. 17 is a sequence diagram illustrating the local data distribution process of the communication system 10B. The procedures will be described for a case where the printer 100 functions as the master and distributes the local data to each of the printers 100A and 100B.

First, the communication controller 801 performs a communication connection for the BLE communication with the printer 100A (S1701), then performs a pairing with the printer 100A (S1702). Next, the synchronization controller 812 transmits the local data B and C stored in the library to the printer 100A via the communication controller 801 (S1703).

When the communication controller 801A receives the local data B and C from the printer 100 (S1704), the synchronization controller 812A stores the local data B and C in the library A (S1705). Hence, the local data C stored in the library and the local data B stored in the library B are also stored in the library A.

The synchronization controller 812A sends a complete notification to the printer 100 (S1706). When the printer 100 receives the complete notification, the communication controller 801 disconnects the communication with the printer 100A (S1707).

Next, the communication controller 801 performs a communication connection for the BLE communication with the printer 100B (S1711), and a pairing with the printer 100B (S1712). Next, the synchronization controller 812 transmits the local data A and C stored in the library to the printer 100B (S1713).

When the communication controller 801B receives the local data A and C from the printer 100 (S1714), the synchronization controller 812B stores the local data A and C in the library B (S1715). Hence, the local data C stored in the library and the local data A stored in the library A are also stored in the library B.

The synchronization controller 812B sends a complete notification to the printer (S1716). When the printer 100 receives the complete notification, the communication controller 801 disconnects the communication connection with the printer 100B (S1717).

By the process illustrated in FIG. 16 and FIG. 17, the local data A, B, and C are stored in the library of each of the printers 100, 100A and 100B, and the libraries of the printers 100, 100A, and 100B are synchronized.

In the third embodiment, when the printer 100 performs the communication connection with the printers 100A and 100B, the printer 100 may notify the users that the communication connection request is being made from the printer 100, by lighting the indicator 132 of the printers 100A and 100B. In addition, the printers 100A and 100B may transmit a connection enable signal to the printer 100, via operation of the dial switch 130 thereof.

(Synchronization Process)

Figure 18:
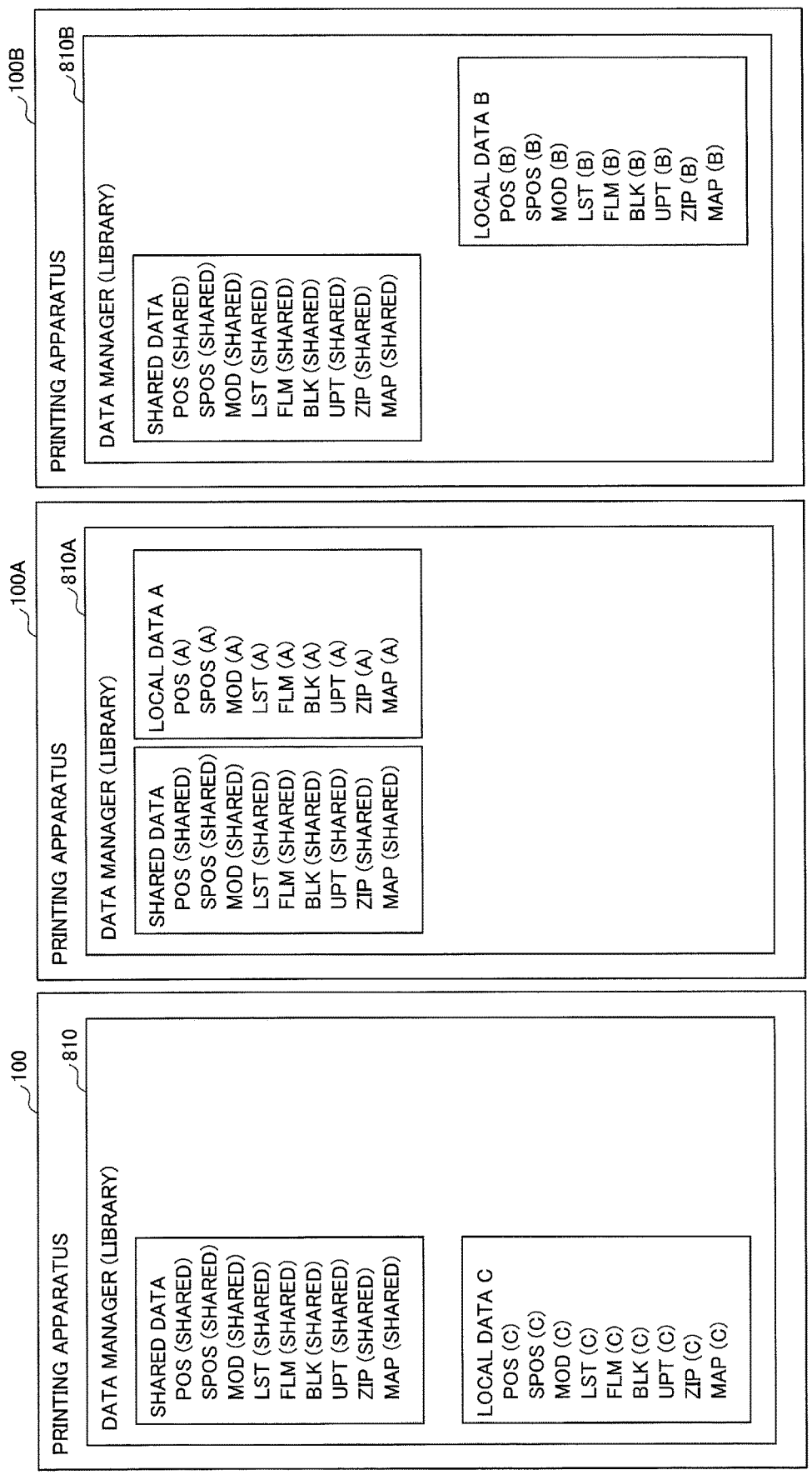
FIG. 18 is a diagram illustrating an example of the synchronization process in the third embodiment.
Figure 19:
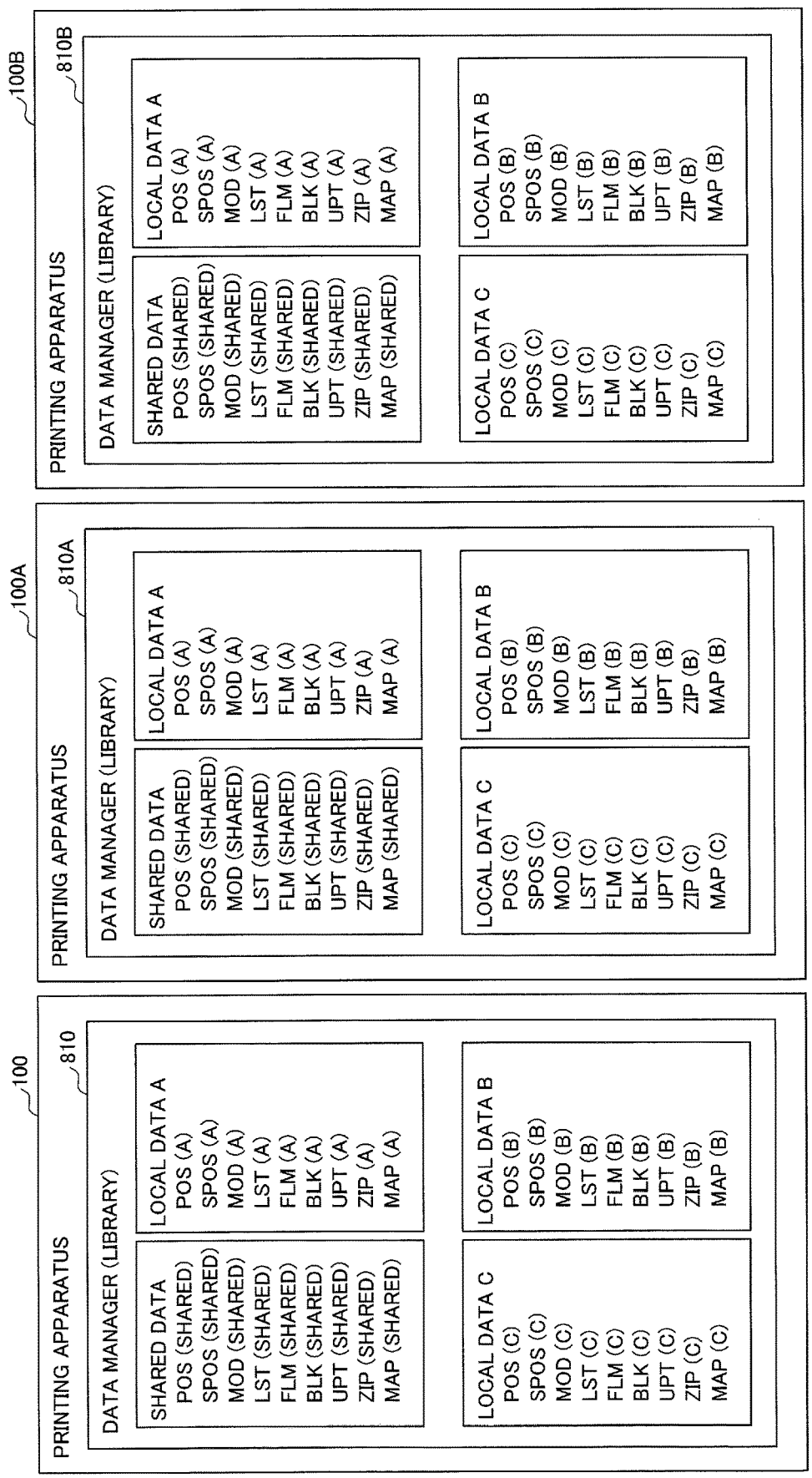
FIG. 19 is a diagram illustrating an example of the synchronization process in the third embodiment.

FIG. 18 and FIG. 19 are diagrams illustrating examples of the synchronization process of the communication system 10B. FIG. 18 illustrates the state of the library of each of the printers 100, 100A, and 100B before the synchronization process. FIG. 19 illustrates the state of the library of each of the printers 100, 100A, and 100B after the synchronization process.

As illustrated in FIG. 18, before the synchronization process is performed, shared data and the local data C are stored in the data manager 810 (library) of the printer 100. In addition, shared data and the local data A are stored in the data manager 810A of the printer 100A, and shared data and the local data B are stored in the data manager 810B of the printer 100B.

The shared data are the data that are already shared by the printers 100, 100A, and 100B and are already stored in the library of each of the printers 100, 100A, and 100B. The local data C is stored only in the library. The local data A is stored only in the library A. The local data B is stored only in the library B.

When the synchronization process is performed in the communication system 10B, the local data A stored in the library A is first transmitted to the printer 100, and stored in the library. Next, the local data B stored in the library B is transmitted to the printer 100, and stored in the library. As a result, the shared data, the local data C, the local data A, and the local data B are stored in the printer 100.

Thereafter, the printer 100 transmits the local data B and the local data C to the printer 100A. The printer 100A stores the local data B and the local data C in the library A. As a result, the shared data, the local data C, the local data A, and the local data B are stored in the library A.

In addition, the printer 100 transmits the local data A and the local data C to the printer 100B. The printer 100B stores the local data A and the local data C in the library B. As a result, the shared data, the local data C, the local data A, and the local data B are stored in the library B.

Accordingly, as illustrated in FIG. 19, the shared data and the local data A, B, and C are stored in the library of each of the printers 100, 100A, and 100B, and the libraries of the printers 100, 100A, and 100B are synchronized.

Figure 20:
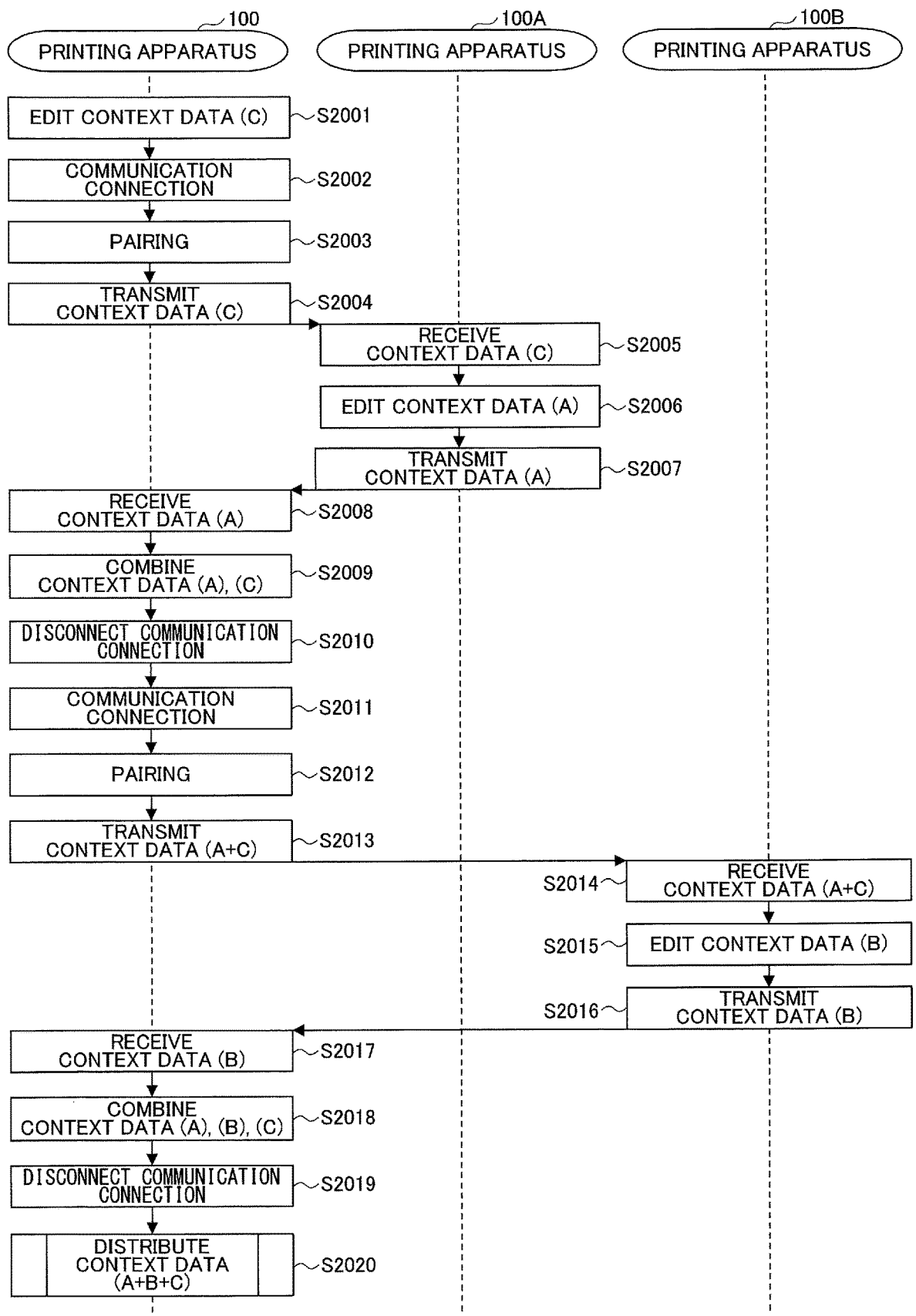
FIG. 20 is a sequence diagram illustrating a data collection process and the data distribution process in the third embodiment.

FIG. 20 is a sequence diagram illustrating a data collection process and the data distribution process of the communication system 10B. The procedures will be described for a case where the printer 100 functions as the master, and collects the data for the application from each of the printers 100A and 100B, and thereafter distributes the output data for the application to each of the printers 100A and 100B.

First, the data controller 802 edits context data (C) for the application (S2001). Next, the communication controller 801 performs a communication connection for the BLE communication with the printer 100A (S2002) and a pairing with the printer 100A (S2003). Next, the data collector 806 transmits the context data (C) to the printer 100A (S2004).

When the communication controller 801A receives the context data (C) from the printer 100 (S2005), the communication data controller 802A edits context data (A) (S2006). Then, the communication controller 801A transmits the edited context data (A) to the printer 100 (S2007).

When the data collector 806 receives the context data (A) from the printer 100A (S2008), the data generator 807 combines the context data (A) and the context data (C) to generate context data (A+C) (S2009). Thereafter, the communication controller 801 disconnects the communication with the printer 100A (S2010).

Next, the communication controller 801 performs a communication connection for the BLE communication with the printer 100B (S2011) and a pairing with the printer 100B (S2012). Next, the data collector 806 transmits the context data (A+C) to the printer 100B (S2013).

When the communication controller 801B receives the context data (A+C) from the printer 100 (S2014), the communication data controller 802B edits context data (B) (S2015). Then, the communication controller 801B transmits the edited context data (B) to the printer 100 (S2016).

When the data collector 806 receives the context data (B) from the printer 100B (S2017), the data generator 807 combines the context data (A+C) and the context data (B) to generate context data (A+B+C) (S2018). Thereafter, the communication controller 801 disconnects the communication connection with the printer 100B (S2019).

Next, the printer 100 distributes the context data (A+B+C) to each of the printers 100A and 100B (S2020). Details of the process to distribute the context data (A+B+C) will be described later in conjunction with FIG. 21.

(Context Data Distribution)

Figure 21:
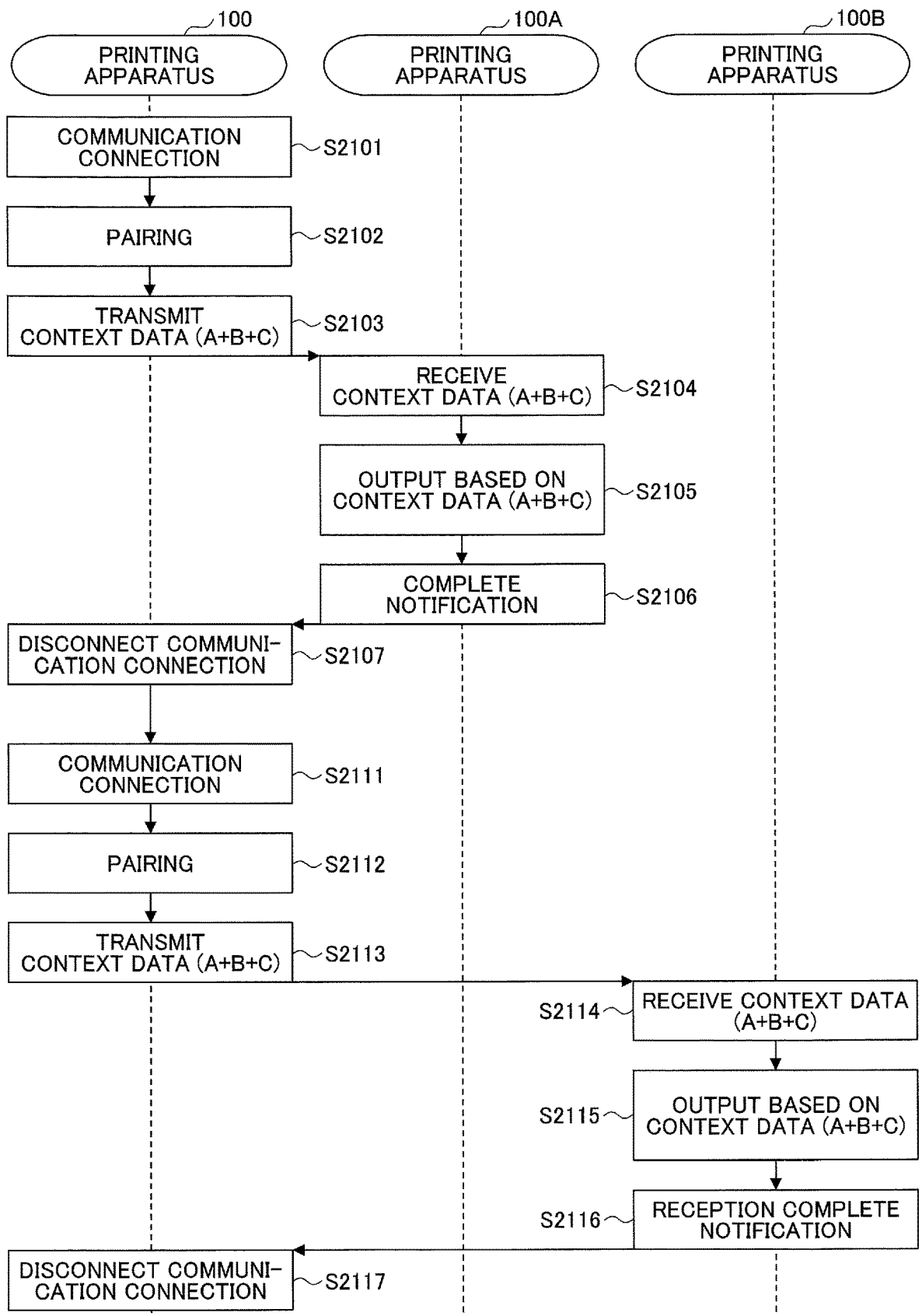
FIG. 21 is a sequence diagram illustrating a context data distribution process in the third embodiment.

FIG. 21 is a sequence diagram illustrating the context data distribution of the communication system 10B. The procedures will be described for a case where the printer 100 is a master and distributes the context data (A+B+C) for the application to each of the printers 100A and 100B.

First, the communication controller 801 performs a communication connection for the BLE communication with the printer 100A (S2101), and a pairing with the printer 100A (S2102). Next, the data distributor 808 transmits the context data (A+B+C) to the printer 100A via the communication controller 801 (S2103).

When the communication controller 801A receives the context data (A+B+C) from the printer 100 (S2104), the application executed by the printer 100A performs the display, printing, or the like of the output target object such as the character data and image data based on the context data (A+B+C) (S2105).

Then, the communication controller 801A sends a complete notification on the receipt of the context data (A+B+C) to the printer 100 (S2106). When the printer 100 receives the complete notification, the communication controller 801 disconnects the communication with the printer 100A (S2107).

Next, the communication controller 801 performs a communication connection for the BLE communication with the printer 100B (S2111), then a pairing with the printer 100B (S2112). Next, the data distributor 808 transmits the context data (A+B+C) to the printer 100B via the communication controller 801 (S2113).

When the communication controller 801B receives the context data (A+B+C) from the printer 100 (S2114), the application executed by the printer 100B performs the display, printing, or the like of the output target object, based on the context data (A+B+C) (S2115).

Then, the communication controller 801B sends a complete notification on the receipt of the context data (A+B+C) to the printer 100 (S2116). When the printer 100 receives the complete notification, the communication controller 801 disconnects the communication with the printer 100B (S2117).

By the processes illustrated in FIG. 20 and FIG. 21, each of the printers 100, 100A, and 100B can output the output target object based on the context data (A+B+C). In other words, each of the printers 100, 100A, and 100B can produce the same output.

(Example of Context Data)

FIG. 22A through FIG. 22C and FIG. 23 are diagrams illustrating examples of the context data used by the communication system 10B.

FIG. 22A illustrates an example of the context data (C) described in conjunction with FIG. 20. The context data (C) is set with an identifier "MAP(C4)" and an identifier "MAP(C5)". The identifier "MAP(C4)" is mapping information for outputting the output target object (block image) identified by "ZIP(C1)" at the output position identified by "ZIP(C1)", with respect to the frame image "FLM(shared)". The identifier "MAP(C5)" is mapping information for outputting the output target object (character string) identified by "ZIP(C3)" at the output position identified by "ZIP(C3)", with respect to the frame image "FLM(shared)".

FIG. 22B illustrates an example of the context data (A) described in conjunction with FIG. 20. The context data (A) is set with an identifier "MAP(A4)" and an identifier "MAP(A5)". The identifier "MAP(A4)" is mapping information for outputting the output target object (block image) identified by "ZIP(A1)" at the output position identified by "ZIP(A1)", with respect to the frame image "FLM(shared)". The identifier "MAP(A5)" is mapping information for outputting the output target object (character string) identified by "ZIP(A3)" at the output position identified by "ZIP(A3)", with respect to the frame image "FLM(shared)".

FIG. 22C illustrates an example of the context data (B) described in conjunction with FIG. 20. The context data (B) is set with an identifier "MAP(B4)" and an identifier "MAP (B5)". The identifier "MAP(B4)" is mapping information for outputting the output target object (block image) identified by "ZIP(B1)" at the output position identified by "ZIP(B1)", with respect to the frame image "FLM(shared)". The identifier "MAP(B5)" is mapping information for outputting the output target object (character string) identified by "ZIP(B3)" at the output position identified by "ZIP(B3)", with respect to the frame image "FLM(shared)".

FIG. 23 illustrates an example of the context data (A+B+C) described in conjunction with FIG. 20 and FIG. 21. The context data (C) illustrated in FIG. 22A, the context data (A) illustrated in FIG. 22B, and the context data (B) illustrated in FIG. 22C are combined in the context data (A+B+C).

(Output Example Based on Context Data)

Figure 24:
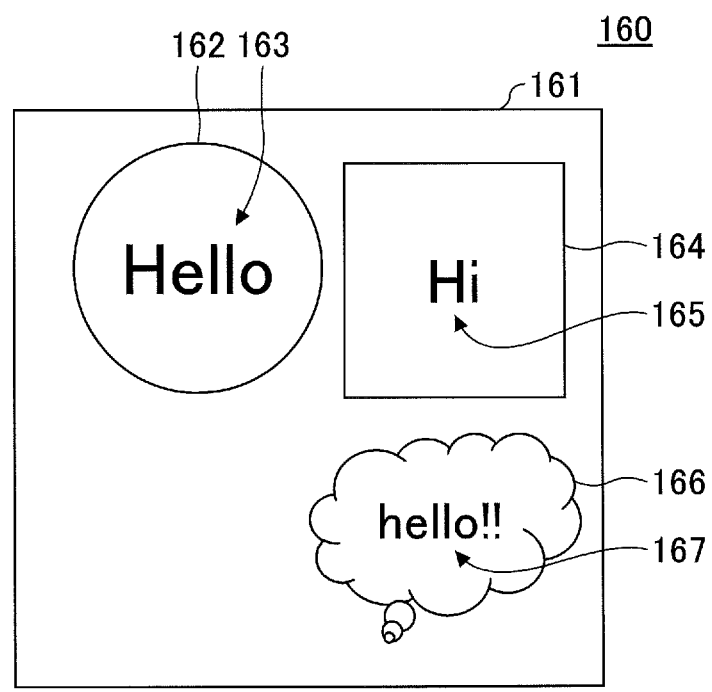
FIG. 24 is a diagram illustrating an output example based on the context data.

FIG. 24 is a diagram illustrating an output example based on the context data of the communication system 10B. Label paper 160 illustrated in FIG. 24 is printed using the context data (A+B+C) illustrated in FIG. 24, at each of the printers 100, 100A, and 100B. The label paper 160 illustrated in FIG. 24 is printed with a frame image 161, a block image 162, a character string 163, a block image 164, a character string 165, a block image 166, and a character string 167, based on the context data (A+B+C).

The frame image 161 "FLM(shared)" of the context data (A+B+C) is combined to the context data (A+B+C) from the context data (C) set by the printer 100.

The block image 162 "BLK(C)" of the context data (A+B+C) is output at the output position "POS(shared)", based on "ZIP(C1)" and "MAP(C4)". "BLK(C)", "POS (shared)", "ZIP(C1)", and "MAP(C4)" are combined to the context data (A+B+C) from the context data (C) set by the printer 100.

The character string 163 "LST(C)" of the context data (A+B+C) is output with the output attribute based on the modifier information "MOD(shared)", at the output position "POS(shared)", based on "ZIP(C2)", "ZIP(C3)", and "MAP (C5)". "LST(C)", "POS(shared)", "MOS(shared)", "ZIP (C2)", "ZIP(C3)", and "MAP(C5)" are combined to the context data (A+B+C) from the context data (C) set by the printer 100.

The block image 164 "BLK(A)" of the context data (A+B+C) is output at the output position "POS(shared)", based on "ZIP(A1)" and "MAP(A4)". "BLK(A)", "POS (shared)", "ZIP(A1)", and "MAP(A4)" are combined to the context data (A+B+C) from the context data (A) set by the printer 100A.

The character string 165 "LST(A)" of the context data (A+B+C) is output with the output attribute based on the modifier information "MOD(shared)" at the output position "POS(shared)", based on "ZIP(A2)", "ZIP(A3)", and "MAP (A5)". "LST(A)", "POS(shared)", "MOS(shared)", "ZIP (A2)", "ZIP(A3)", and "MAP(A5)" are combined to the context data (A+B+C) from the context data (A) set by the printer 100A.

The block image 166 "BLK(B)" of the context data (A+B+C) is output at the output position "POS(shared)", based on the "ZIP(B1)" and "MAP(B4)". "BLK(B)", "POS (shared)", "ZIP(B1)", and "MAP(B4)" are combined to the context data (A+B+C) from the context data (B) set by the printer 100B.

The character string 167 "LST(B)" of the context data (A+B+C) is output with the output attribute based on the modifier information "MOD(B)", at the output position "POS(B)", based on "ZIP(B2)", "ZIP(B3)", and "MAP(B5) ". "LST(B)", "POS(B)", "MOS(B)", "ZIP(B2)", "ZIP(B3)", and "MAP(B5)" are combined to the context data (A+B+C) from the context data (B) set by the printer 100B.

Each of the printers 100, 100A, and 100B can print the common printing contents illustrated in FIG. 24 on the label paper 160. Although FIG. 24 illustrates the output example to the label paper 160, the output is not limited to such, and each of the printers 100, 100A, and 100B may output the contents illustrated in FIG. 24 on the display screen of the display of the smartphone, for example.

Figure 25:
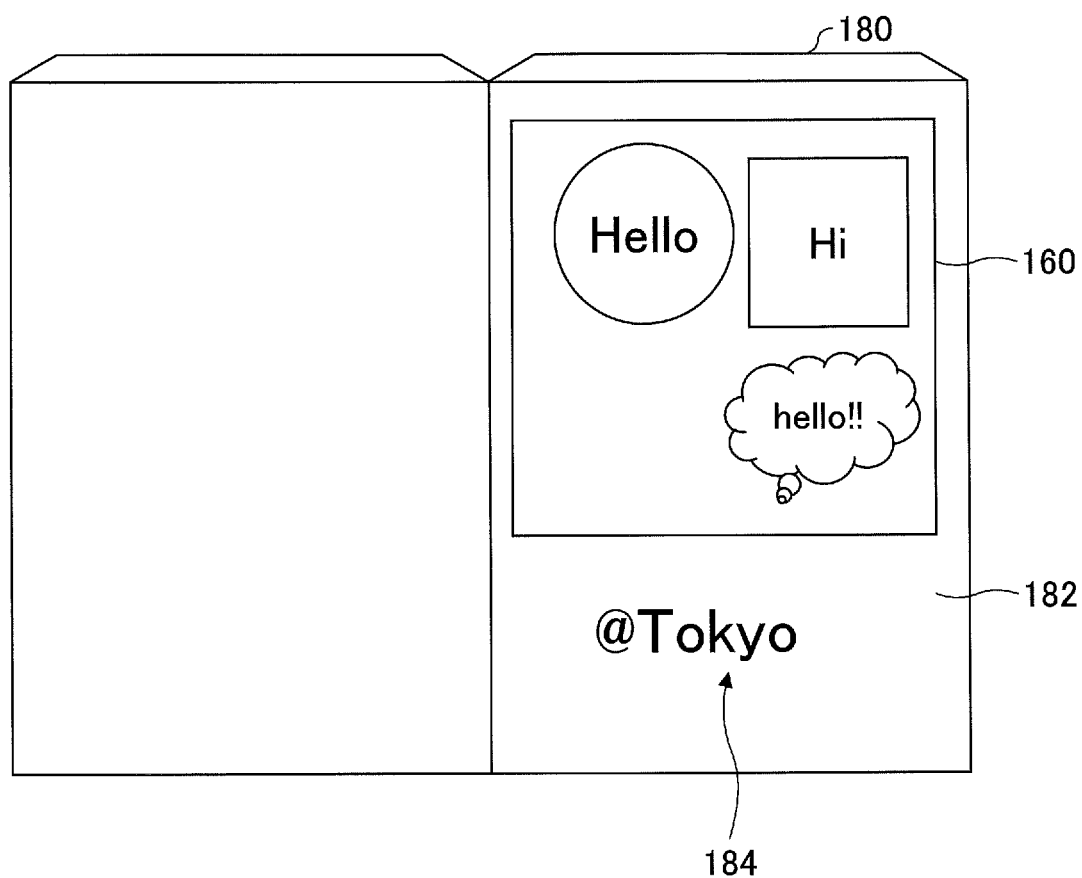
FIG. 25 is a diagram illustrating an example of pasting label paper.

FIG. 25 is a diagram illustrating an example of pasting label 160. FIG. 25 illustrates an example in which the label 160 is pasted onto a surface 182 of a user's pocketbook 180. As described above in conjunction with FIG. 24, the label 160 can be printed by each of the printers 100, 100A, and 100B using the context data (A+B+C). Each of the users of the printers 100, 100A, and 100B can paste the label 160 printed with the common contents onto the user's own pocketbook 180. Each of the printers 100, 100A, and 100B may change the size of the label paper 160 according to the size of the surface 182. The size change of the label paper 160 may be made by changing the expansion cassette, or by changing the label paper 160 accommodated within the cassette. When the label paper 160 having a plurality of different sizes can be accommodated within the cassette, the label paper 160 having a size appropriate for the surface 182 may be selected from the different sizes. As illustrated in FIG. 25, the user can write a character string 184 or the like on the surface 182. As will be described later in conjunction with FIG. 28, the writing may be made by an expansion unit 110D mounted on the printer 100.

Fourth Embodiment

The printer 100 in a fourth embodiment will be described by referring to FIG. 26. In the fourth embodiment, a communication system 100 is described. The printer 100 and three sensor devices 170A, 170B, and 170C that perform the intergroup communication form the communication system 100.

Figure 26:
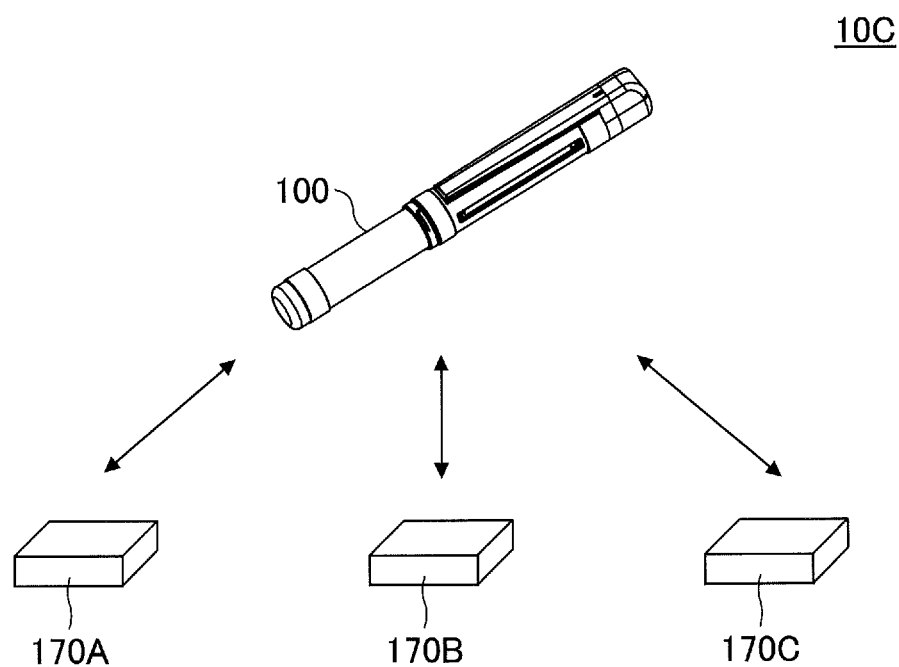
FIG. 26 is a diagram illustrating the communication system in a fourth embodiment.

FIG. 26 is a diagram illustrating the communication system 100. The printer 100 in the fourth embodiment forms a group with the sensor devices 170A, 170B, and 107C, and performs the intergroup communication with the sensor devices 170A, 170B, and 170C by the BLE communication. In the fourth embodiment, the printer 100 is a master device, and each of the sensor devices 170A, 170B, and 170C are a slave device. Each of the sensor devices 170A, 170B, and 170C may be formed by any kind of sensor device, such as a temperature sensor, a pressure sensor, a position sensor, an acceleration sensor, for example.

The printer 100 may collect various detection data, including the temperature, pressure, position, acceleration, from each of the sensor devices 170A, 170B, and 170C. The printer 100 may store the detection data in the memory 402, and print the detection data by the print unit 120. By printing the detection data on the label paper, the printed label can be pasted onto the pocketbook 180. In addition, the printer 100 may output the detection data to the smartphone 200 via the intergroup communication. Further, the printer 100 may share the detection data with other printers.

Although the printer 100 forms the group with the three sensor devices 170A, 170B, and 170C in FIG. 26, the printer 100 may form the group with two or less, or four or more sensor devices.

Fifth Embodiment

The printer 100 in a fifth embodiment will be described, by referring to FIG. 27. In the fifth embodiment, a communication system 10D is described. The printer 100, two other printers 100A and 100B, and a sensor device 170A that perform the intergroup communication, form the communication system 10D.

Figure 27:
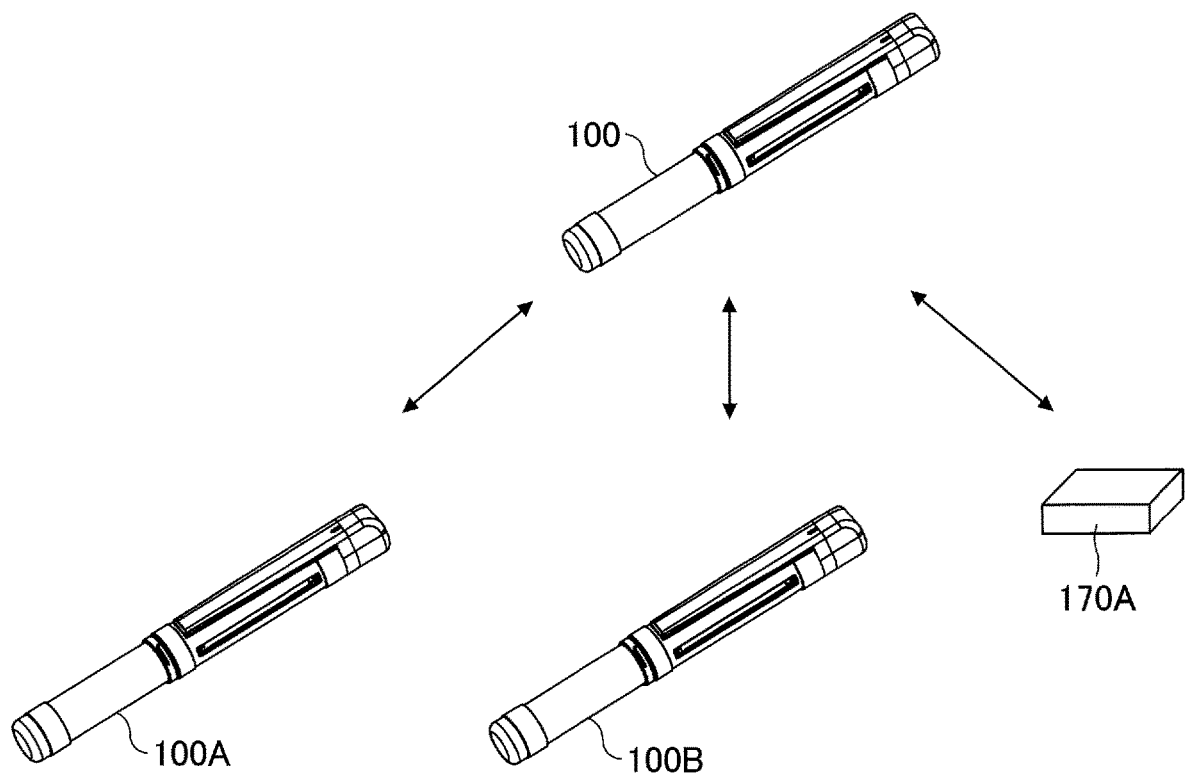
FIG. 27 is a diagram illustrating the communication system in a fifth embodiment.

FIG. 27 is a diagram illustrating the communication system 10D. The printer 100 in the fifth embodiment forms a group with the printers 100A and 100B and the sensor device 170A, and performs the intergroup communication by the BLE communication. In the fifth embodiment, the printer 100 is a master device, and each of the printers 100A and 100B and the sensor device 170A are slave devices. The sensor device 170A may be formed by any kind of sensor device.

The printer 100 may collect detection data from the sensor device 170A. The printer 100 may store the detection data in the memory 402, and print the detection data. In addition, the printer 100 may output the detection data to the smartphone 200 via the intergroup communication. Further, the printer 100 may share the detection data with the printers 100A and 100B.

In the communication system 10D, the printers 100A and 100B include functions similar to the functions of the printer 100. Accordingly, each of the printers 100A and 100B may print, and perform the intergroup communication, similarly to the printer 100. In addition, each of the printers 100A and 100B may perform the intergroup communication with the smartphone 200, and may function as a master device, similarly to the printer 100.

The printers 100, 100A, and 100B of the communication system 10D may be similar to the printers 100, 100A, and 100B of the third embodiment. Accordingly, each of the printers 100, 100A, and 100B in the fifth embodiment may function similarly as in the third embodiment, and thus, the printer 100 may function as the master and synchronize the libraries, collect the context data for the application, and combine the collected context data to be distributed to the printers 100A and 100B.

[Mounting Example of Expansion Unit]

Figure 28:
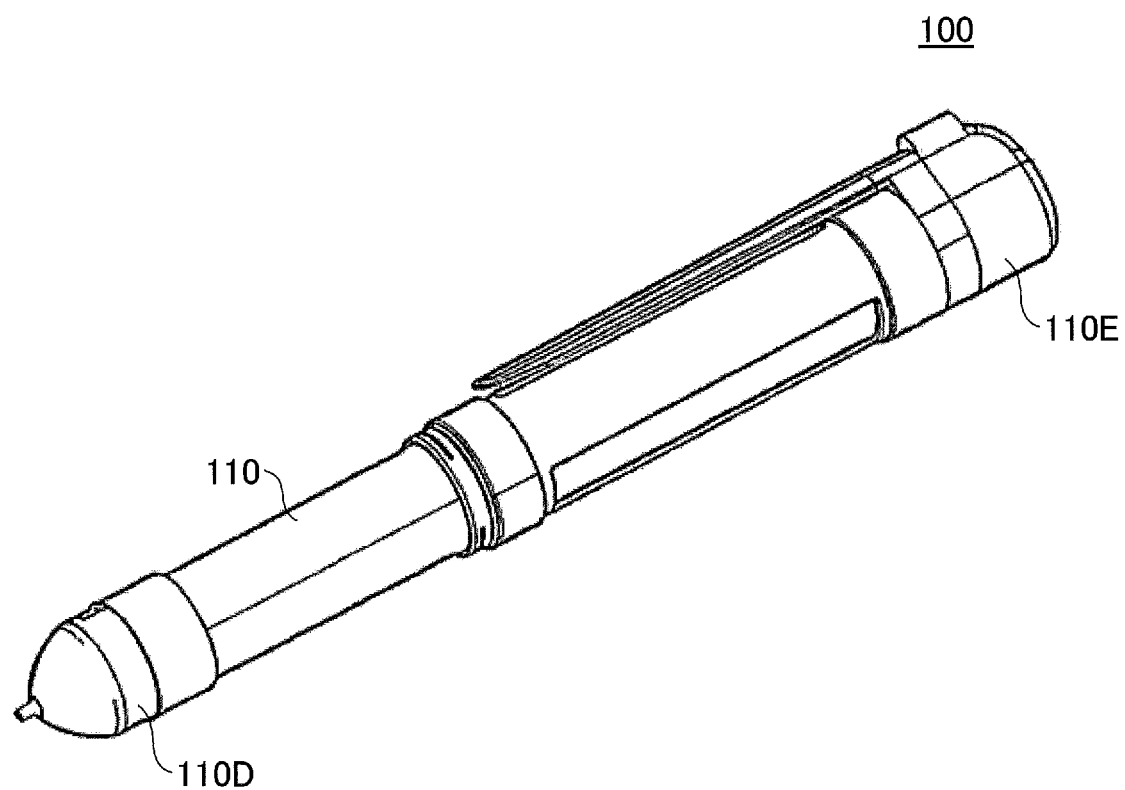
FIG. 28 is a diagram illustrating an example of an expansion unit mounted on the printer.

FIG. 28 is a diagram illustrating an example of an expansion unit mounted on the printer 100. In FIG. 28, the expansion unit 110D is detachably provided on the tip end of the casing 110, in place of the cap 110B. In addition, an expansion unit 110E is detachably provided on the rear end of the casing 110 in place of the cap 110C.

The expansion unit 110D is a pen-tip unit, which is provided with a writing utensil, and a tip end of the writing utensil projects from a tip end of the expansion unit 110D. By mounting the expansion unit 110D on the printer 100, it is possible to write on the recording paper printed by the print unit 120 or the pocketbook 180, using the writing utensil provided on the expansion unit 110D. Hence, the functionality of the printer 100 is improved, because the printer 100 includes the writing function, in addition to the printing and the intergroup communication functions.

The expansion unit 110E is a laser pointer unit. A laser unit is provided inside the expansion unit 110E, and a laser beam emission hole is formed in a rear end of the expansion unit 110E. By mounting the expansion unit 110E on the printer 100, it becomes possible to irradiate the laser beam towards an arbitrary instruction target such as a whiteboard. The functionality of the printer 100 is improved, because the printer 100 includes the laser pointer in addition to the printing and the intergroup communication functions. The expansion unit 110E is electrically connected to the printer 100 by terminals, and the operation of the laser unit may be controlled by the dial switch 130.

FIG. 29 through FIG. 32 are flow charts illustrating a mode switching process of the mode switch 805.

Figure 29:
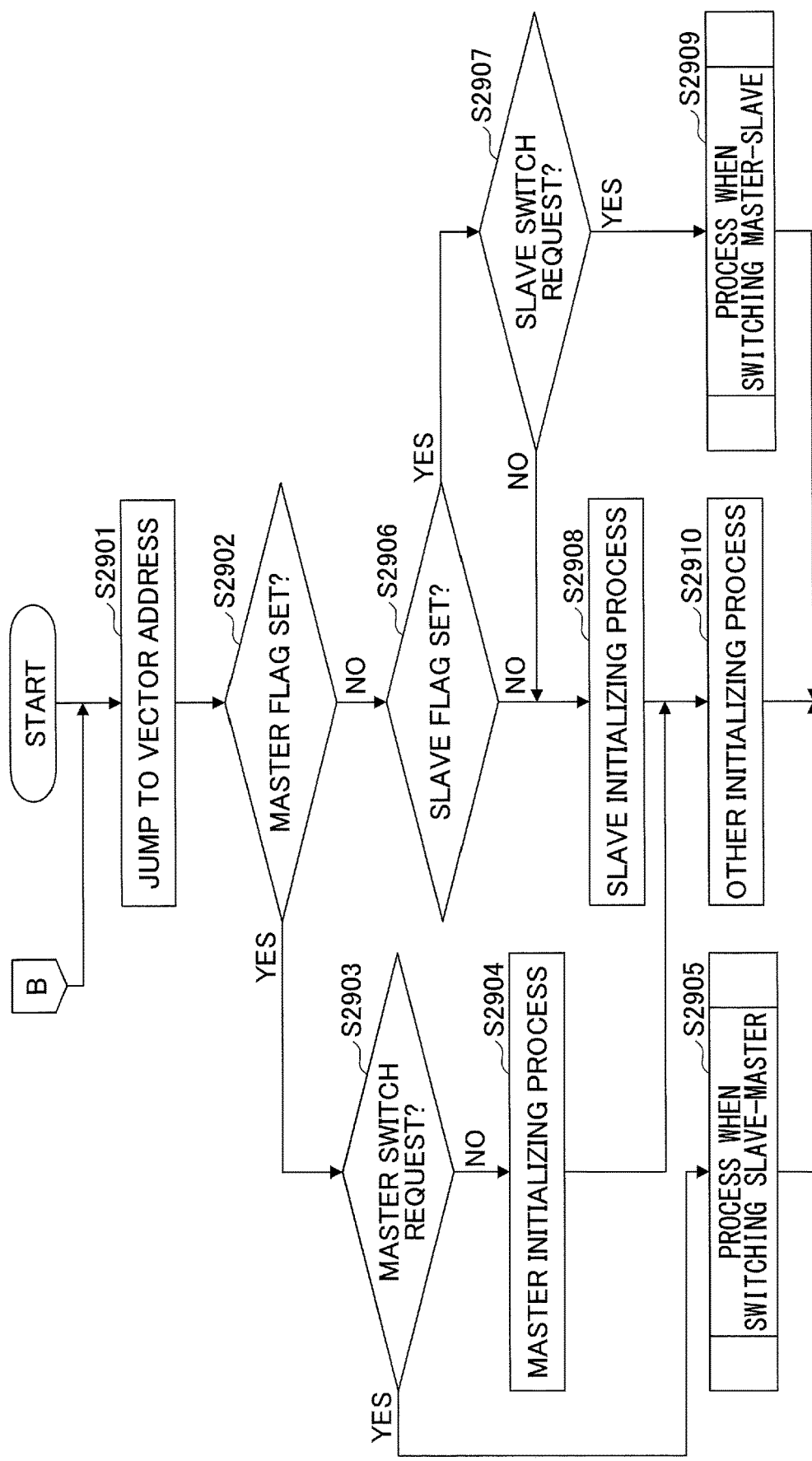
FIG. 29 is a flow chart illustrating procedures of a mode switching process.

First, when the power is turned on, the mode switch 805 starts a process from a vector address (S2901) in FIG. 29. Next, the mode switch 805 determines whether a master flag is set (S2902).

If it is determined that the master flag is set (Yes in S2902), the mode switch 805 determines whether a master switch request is made (S2903). If it is determined that the master switch request is made (Yes in S2903), the mode switch 805 performs a slave-master switch process (S2905). Then, process advances to S3001. On the other hand, if it is determined that the master switch request is not made (No in S2903), the mode switch 805 performs a master initializing process (S2904) and other initializing processes (S2910) before the process advances to S3001.

If it is determined that the master flag is not set (No in S2902), the mode switch 805 determines whether a slave flag is set (S2906).

If it is determined that the slave flag is set (Yes in S2906), the mode switch 805 determines whether a slave switch request is made (S2907). If it is determined that the slave switch request is made (Yes in S2907), the mode switch 805 performs a master-slave switch process (S2909). Then, process advances to 3001. On the other hand, if it is determined that the slave switch request is not made (No in S2907), the mode switch 805 performs a slave initializing process (S2908) and the other initializing processes (S2910).

If it is determined that the slave flag is not set (No in S2906), the mode switch 805 performs the slave initializing process (S2908) and the other initializing processes (S2910).

Figure 30:
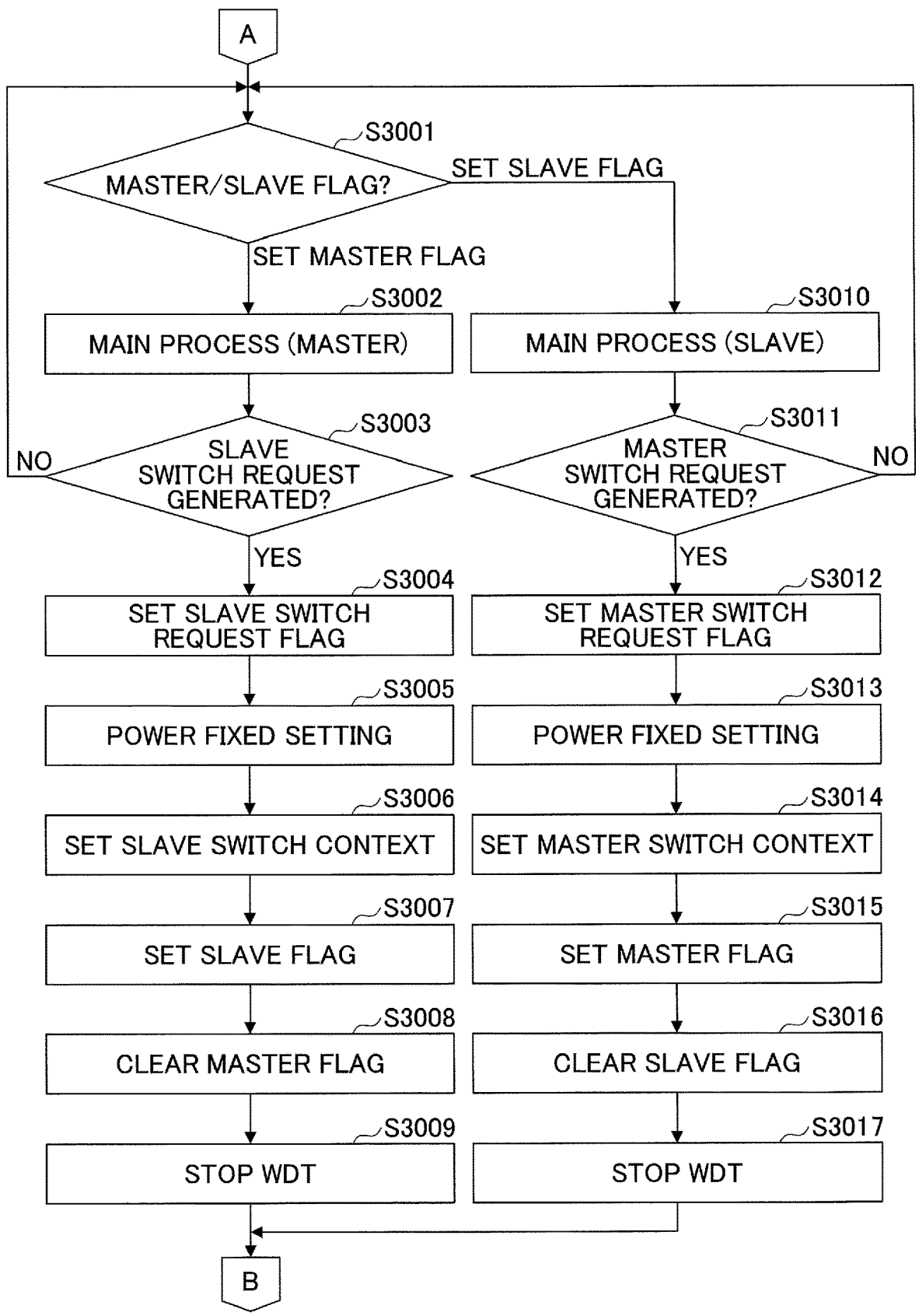
FIG. 30 is a flow chart illustrating the procedures of the mode switching process.

In FIG. 30, the mode switch 805 determines whether the master flag or the slave flag is set (S3001).

If it is determined in S3001 that the master flag is set, the mode switch 805 performs a main process (master) (S3002). Then, the mode switch 805 determines whether the slave switch request is generated (S3003). If it is determined that the slave switch request is not generated (No in S3003), the process returns to S3001. On the other hand, if it is determined that the slave switch request is generated (Yes in S3003), the mode switch 805 sets a slave switch request flag (S3004). In addition, the mode switch 805 performs a power fixed setting (S3005). Then, the mode switch 805 sets a slave switch context (S3006). In addition, the mode switch 805 sets a slave flag (S3007), and clears a master flag (S3008). Further, the mode switch 805 stops a WDT (Watch-Dog Timer) (S3009). Thereafter, process returns to S2901.

In contrast, if it is determined in S3001 that the slave flag is set, the mode switch 805 performs a main process (slave) (S3010). Then, the mode switch 805 determines whether the master switch request is generated (S3011). If it is determined that the master switch request is not generated (No in S3011), the process returns to S3001. On the other hand, if it is determined that the master switch request is generated (Yes in S3011), the mode switch 805 sets a master switch request flag (S3012). In addition, the mode switch 805 performs a power fixed setting (S3013). Then, the mode switch 805 sets a master switch context (S3014), and sets a master flag (S3015), and clears the slave flag (S3016). Further, the mode switch 805 stops the WDT (S3017). Thereafter, process returns to S2901.

Figure 31:
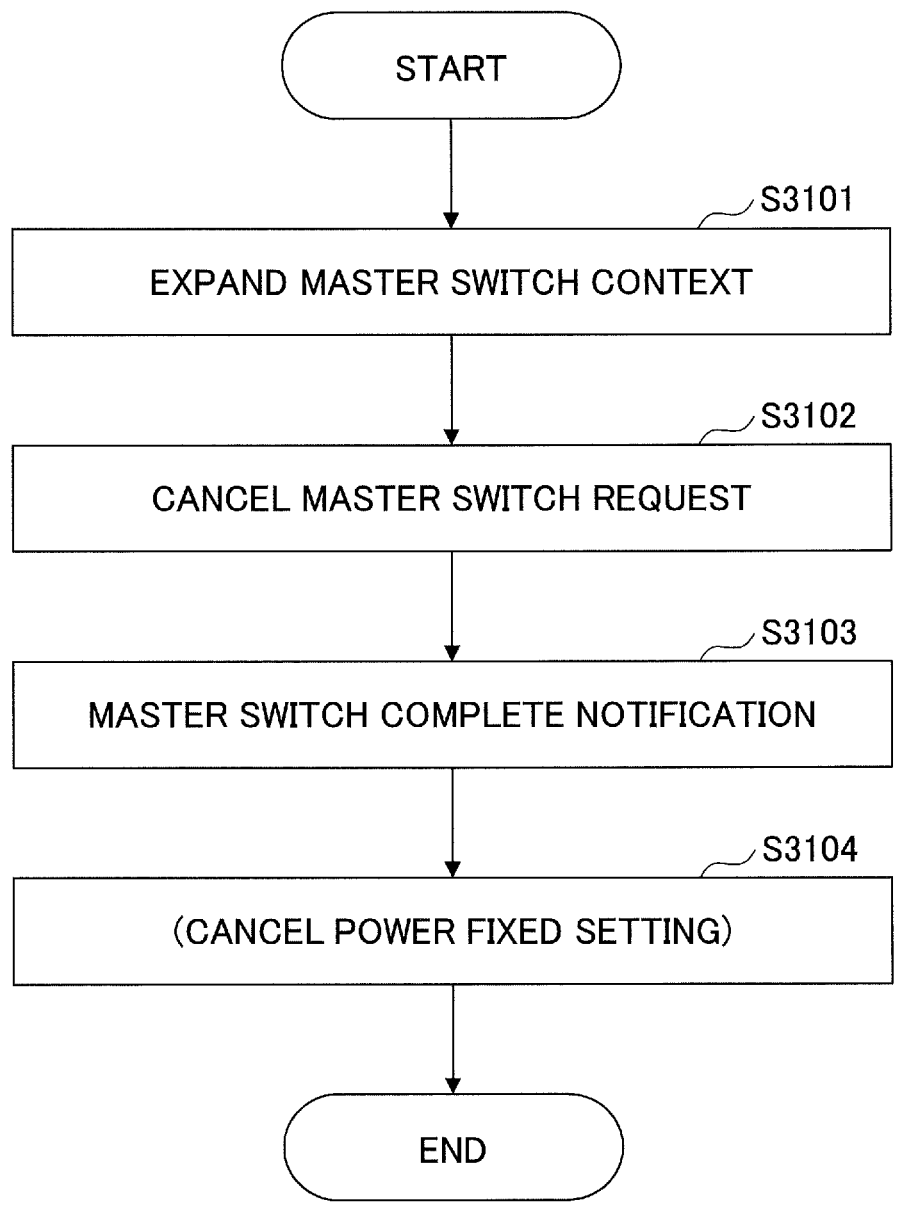
FIG. 31 is a flow chart illustrating the procedures of the mode switching process.

In the slave-master switch process illustrated in FIG. 31, the mode switch 805 expands the master switch context (S3101), and cancels the master switch request (S3102).

Then, the mode switch 805 performs a master switch complete notification (S3103). Further, the mode switch 805 cancels the power fixed setting (S3104).

Figure 32:
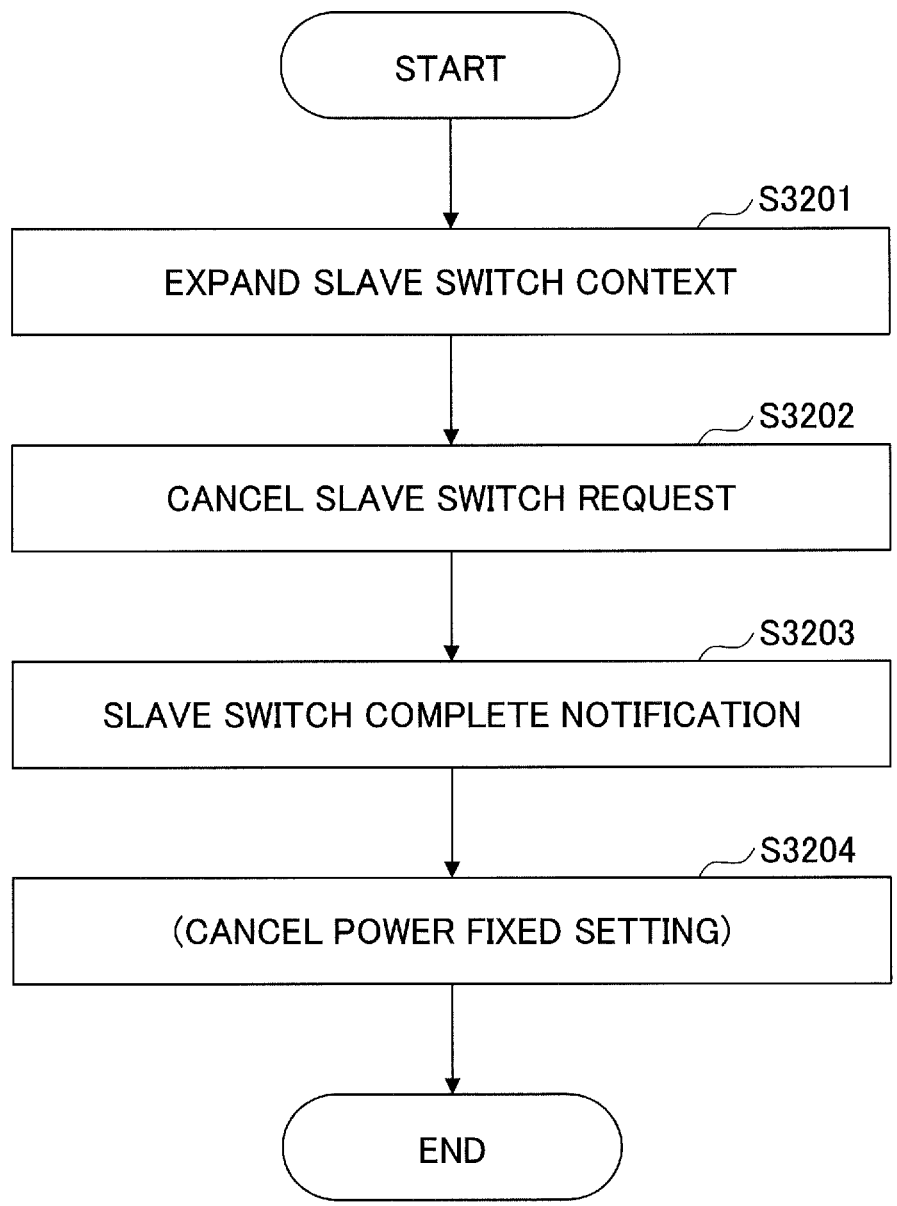
FIG. 32 is a flow chart illustrating the procedures of the mode switching process.

In the master-slave switch process illustrated in FIG. 32, the mode switch 805 expands the slave switch context (S3201), cancels the slave switch request (S3202), then performs a slave switch complete notification (S3203). Further, the mode switch 805 cancels the power fixed setting (S3204).

In a default setting, the print apparatus 100 is in a slave mode. For this reason, if it is determined in S2902 that the master flag is not set, it is determined in S2906 whether the slave flag is set. In this case, the process advances to S2907 because the slave flag is set, however, because the slave switch request flag is not set, the slave initializing process is performed in S2908, and the process advances to S2910 to end the initializing process.

Next, the process advances to S3001, however, because the slave flag is set, the process advances to the main process (slave) of S3010, and a loop of S3001, S3010, and S3011 is continued until the master switch request is generated. When the master switch request is generated, the process advances to S3012 by the determination in S3011 to set the master switch request flag. Thereafter, the power fixed setting is made in S3013, the master flag is set in S3015, and the WDT is stopped in S3017.

Thereafter, the CPU performs the initializing process in the power on state, and the process returns to S2902. At this time, the process advances to S2903 because the master flag is set in S3015. In this state, because the master switch request flag is set in S3012, the determination result in S2903 is Yes, and the process advances to the slave-master switch process of S2905.

Next, the master switch context is expanded in S3101, the master switch request is canceled in S3102, and the master switch complete notification is performed in S3013. In this state, the power fixed setting is canceled in S3104. A setting may be made to enable or disable S3104, in order to enable setting of whether to inherit a part of the data when the mode switching is made.

When canceling the power fixed setting, the power needs to be turned on again after the power is disconnected. In this case, the process advances to S2903 because the master flag is set in S2902, however, because the master switch request is canceled, the master initializing process of S2904 and the other initializing processes of S2905 are performed. In addition, because it is determined in S3001 that the master flag is set, the process advances to S3002 to perform the main process as the master. A loop of S3003, S3001, and S3002 is continued and the printer 100 continues to operate as the master until the slave switch request is generated. When the slave switch request is generated, the process of S3004 and subsequent steps are performed, and the mode returns from the master mode to the slave mode. The process performed thereafter is similar to that described above.

As described above, the printer 100 is detachable to, and can perform the intergroup communication with the smartphone 200. In addition, the printer 100 can perform the intergroup communication with other printers or sensor devices. According to each of the embodiments described above, it is possible to easily enable intergroup communication by a printer that is easy to carry.

The present invention is not limited to these embodiments, but various variations and modifications may be made without departing from the scope of the present invention.

What is claimed is:

1. A communication system comprising:
an information terminal; and
a printing apparatus configured to perform intergroup communication with the information terminal, the printing apparatus and the information terminal belonging to a group which is permitted to participate in the intergroup communication, the group including only specific users or apparatuses,
wherein the printing apparatus includes
a printing part configured to perform printing,
a communication controller configured to control object data transmission and reception with the information terminal using context data, the context data including identification information for identifying the object, and position information indicating an output position of the object at a time of printing or display,
a data receiver configured to receive print data from the information terminal via the intergroup communication, and
a print controller configured to control the printing part using the received print data, wherein
the context data includes
a header region including the identification information, and
a data region including
element information,
combination information defining a combination of the element information, and
expansion information including mapping information that defines an expansion process performed in a transmission destination of the context data.

2. The communication system as claimed in claim 1, wherein the element information includes
the position information,
position set information including an aggregate of the position information,
list information for identifying text data transmitted by the context data,
modifier information including information of character data transmitted by the context data,
frame image information for identifying frame image data transmitted by the context data,
block image data transmitted by the context data, and
unit pattern image data transmitted by the context data.

3. A communication system comprising:
an information terminal; and
a printing apparatus configured to perform intergroup communication with the information terminal, the printing apparatus and the information terminal belonging to a group which is permitted to participate in the intergroup communication, the group including only specific users or apparatuses,
wherein the printing apparatus includes
a printing part configured to perform printing,
a communication controller configured to control object data transmission and reception with the information terminal using context data, the context data including identification information for identifying the object, and position information indicating an output position of the object at a time of printing or display,
a data receiver configured to receive print data from the information terminal via the intergroup communication, and a print controller configured to control the printing part using the received print data, wherein the communication controller is further configured to set an access authority, including a group identifier and a user identifier of the identification information, to the context data transmitted, and determine the access authority of the context data received, using the group identifier and the user identifier of a user permitted to participate in the group identified by the group identifier.

4. A printing apparatus which performs intergroup communication with an information terminal, the information terminal and the printing apparatus belonging to a group which is permitted to participate in the intergroup communication, the group including only specific users or apparatuses, the printing apparatus comprising:

a communication controller configured to control object data transmission and reception with the information terminal using context data, the context data including identification information for identifying the object, and position information indicating an output position of the object at a time of printing or display;

a printing part configured to perform printing;

a data receiver configured to receive print data from the information terminal via the intergroup communication; and a print controller configured to control the printing part using the received print data, wherein the context data includes a header region including the identification information, and a data region including
element information,
combination information defining a combination of the element information, and
expansion information including mapping information that defines an expansion process performed in a transmission destination of the context data.

5. The printing apparatus as claimed in claim 4, further comprising:

a data collector configured to collect data for an application from another apparatuses via the intergroup communication, and a data generator configured to generate output data for the application, using data for a plurality of applications collected by the data collector.

6. The printing apparatus as claimed in claim 4, further comprising:

a casing; and at least one of a pen-tip unit and a laser pointer unit, that are detachable with respect to the casing.

7. The printing apparatus as claimed in claim 4, wherein the element information includes the position information,
position set information including an aggregate of the position information,
list information for identifying text data transmitted by the context data,
modifier information including information of character data transmitted by the context data,
frame image information for identifying frame image data transmitted by the context data,
block image data transmitted by the context data, and
unit pattern image data transmitted by the context data.

8. A printing apparatus which performs intergroup communication with an information terminal, the information terminal and the printing apparatus belonging to a group which is permitted to participate in the intergroup communication, the group including only specific users or apparatuses, the printing apparatus comprising:

a communication controller configured to control object data transmission and reception with the information terminal using context data, the context data including identification information for identifying the object, and position information indicating an output position of the object at a time of printing or display;

a printing part configured to perform printing;

a data receiver configured to receive print data from the information terminal via the intergroup communication; and a print controller configured to control the printing part using the received print data, wherein the communication controller is further configured to set an access authority, including a group identifier and a user identifier of the identification information, to the context data transmitted, and determine the access authority of the context data received, using the group identifier and the user identifier of a user permitted to participate in the group identified by the group identifier.

9. The printing apparatus as claimed in claim 8, further comprising:

a data collector configured to collect data for an application from another apparatuses via the intergroup communication, and a data generator configured to generate output data for the application, using data for a plurality of applications collected by the data collector.

10. The printing apparatus as claimed in claim 8, further comprising:

a casing; and at least one of a pen-tip unit and a laser pointer unit, that are detachable with respect to the casing.

\* \* \* \* \*